United States Patent
Oh et al.

(10) Patent No.: US 12,299,943 B2
(45) Date of Patent: May 13, 2025

(54) POINT CLOUD DATA TRANSMISSION METHOD, POINT CLOUD DATA TRANSMISSION DEVICE, POINT CLOUD DATA RECEPTION METHOD, AND POINT CLOUD DATA RECEPTION DEVICE

(71) Applicant: LG ELECTRONICS INC., Seoul (KR)

(72) Inventors: Hyunmook Oh, Seoul (KR); Hansol Choi, Seoul (KR); Donggyu Sim, Seoul (KR); Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 32 days.

(21) Appl. No.: 18/039,852

(22) PCT Filed: Nov. 29, 2021

(86) PCT No.: PCT/KR2021/017758
§ 371 (c)(1),
(2) Date: Jun. 1, 2023

(87) PCT Pub. No.: WO2022/119254
PCT Pub. Date: Jun. 9, 2022

(65) Prior Publication Data
US 2024/0029312 A1    Jan. 25, 2024

(30) Foreign Application Priority Data
Dec. 4, 2020  (KR) .................. 10-2020-0168659

(51) Int. Cl.
*G06T 9/00* (2006.01)
*H04N 19/119* (2014.01)
(Continued)

(52) U.S. Cl.
CPC .................. *G06T 9/001* (2013.01)

(58) Field of Classification Search
None
See application file for complete search history.

(56) References Cited

U.S. PATENT DOCUMENTS

2019/0080483 A1 * 3/2019 Mammou ............. G06T 3/4007
2020/0111236 A1 * 4/2020 Tourapis ................ G06T 9/001

FOREIGN PATENT DOCUMENTS

| KR | 10-2020-0005539 A | 1/2020 |
| WO | 2020/115282 A1 | 6/2020 |
| WO | 2020/190093 A1 | 9/2020 |

OTHER PUBLICATIONS

G-PCC codec description v8, Convenor ISO/IEC JTC1/SC29/WG11, Oct. 2, 2020, Document N19525.

* cited by examiner

*Primary Examiner* — Dakshesh D Parikh
(74) *Attorney, Agent, or Firm* — Bryan Cave Leighton Paisner LLP

(57) ABSTRACT

A point cloud data transmission method according to embodiments may comprise the steps of: encoding point cloud data; and transmitting a bitstream including the point cloud data. In addition, a point cloud data transmission device according to embodiments may comprise: an encoder which encodes point cloud data; and a transmitter which transmits a bitstream including the point cloud data. In addition, a point cloud data reception method may comprise the steps of: receiving a bitstream including point cloud data; and decoding the point cloud data. In addition, a point cloud data reception device may comprise: a reception unit which receives a bitstream including point cloud data; and a decoder which decodes the point cloud data.

24 Claims, 39 Drawing Sheets

(51) Int. Cl.
*H04N 19/136* (2014.01)
*H04N 19/184* (2014.01)
*H04N 19/597* (2014.01)

$1 + 2 + 4 + 8 = 15$

Scan order of nodes at the same depth

FIG. 32

| Attribute_node_tree ( ) { | Descriptor |
|---|---|
| split_node_flag | u(1) |
| if(split_node_flag) | |
| { | |
| split_type | u(v) |
| if(split_type != 0)//if not octree | |
| split_direction | u(v) |
| for(i=0; i<num_of_childnode; i++) | |
| Attribute_node_tree () | |
| } | |
| attribute_data_unit ( ) | |
| else | |
| } | |

FIG. 33

| | Descriptor |
|---|---|
| attribute_data_unit ( ) { | |
|    AttrDim = attribute_dimension_minus1[ ash_attr_sps_attr_idx ] + 1 | |
|    for( k = 0; k < AttrDim; k++ ) | |
|       { | |
|       attribute_data_unit_header( ) | |
|       if(attr_coding_type == 4 ) | |
|          attribute_data_unit_data_type_ccp( ) | |
|       .... | |
|       else if( attr_coding_type != 3 ) | |
|          attribute_data_unit_data( ) | |
|       else | |
|          attribute_data_unit_raw_data( ) | |
|    } | |
| } | |

FIG. 34

| attribute_data_unit_data_ccp( ) { | Descriptor |
|---|---|
| parse_parameter_flag | u(1) |
| if(parse_parameter_flag == 1) | |
| { | |
| weight | u(v) |
| offset | u(v) |
| } | |
| } | |

POINT CLOUD DATA TRANSMISSION METHOD, POINT CLOUD DATA TRANSMISSION DEVICE, POINT CLOUD DATA RECEPTION METHOD, AND POINT CLOUD DATA RECEPTION DEVICE

CROSS-REFERENCE TO RELATED APPLICATIONS

This application is the National Stage filing under 35 U.S.C. of International Application No. PCT/KR2021/017758, filed on Nov. 29, 2021, which claims the benefit of earlier filing date and right of priority to Korean Application No. 10-2020-0168659, filed on Dec. 4, 2020, the contents of which are all hereby incorporated by reference herein in their entirety.

TECHNICAL FIELD

Embodiments relate to a method and device for processing point cloud content.

BACKGROUND

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

SUMMARY

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

To achieve these objects and other advantages and in accordance with the purpose of the disclosure, as embodied and broadly described herein, a method of transmitting point cloud data may include encoding the point cloud data, and transmitting a bitstream containing the point cloud data. A method of receiving point cloud data according to embodiments may include receiving a bitstream containing point cloud data and decoding the point cloud data.

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 32 shows an exemplary syntax of attribute_node_tree( ) according to embodiments;

FIG. 33 illustrates an exemplary syntax of attribute_data_unit according to embodiments;

FIG. 34 shows an exemplary syntax of attribute_data_unit_data_ccp( ) according to embodiments;

DETAILED DESCRIPTION

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
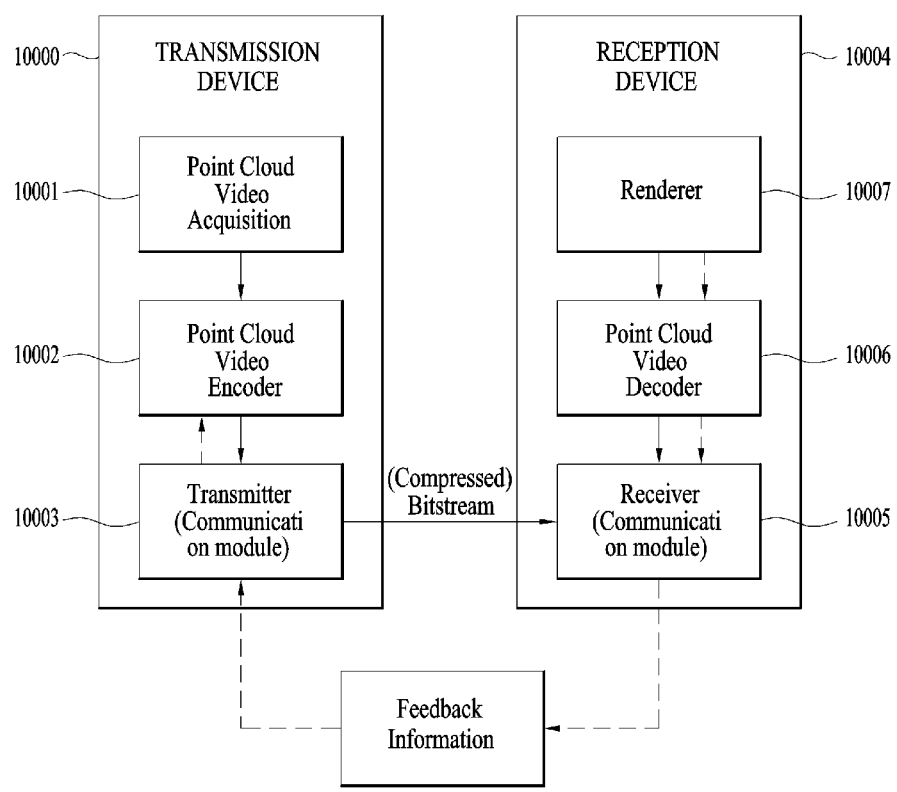
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data or point cloud data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (e.g., a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT)

device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (e.g., a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (e.g., in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
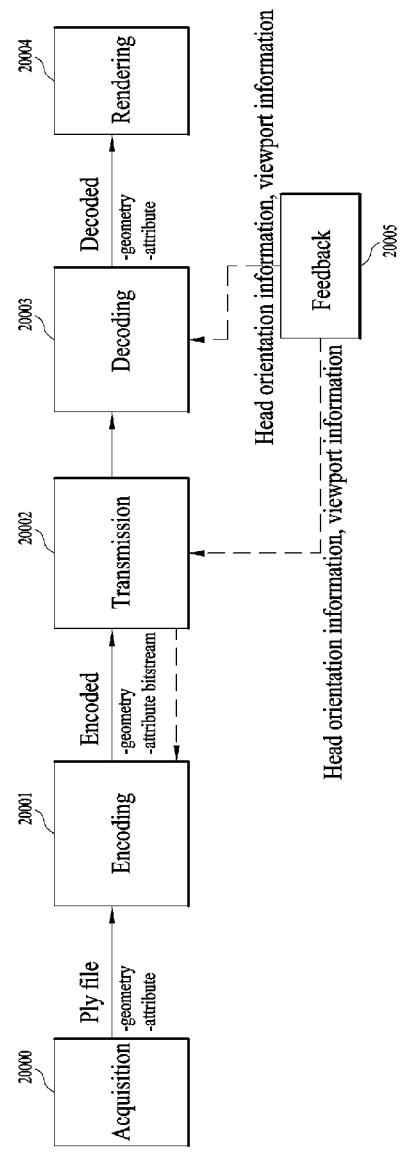
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (e.g., the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (e.g., values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (e.g., the point cloud transmission device 10000 or the point cloud video acquirer 10001) may secure point cloud data from information (e.g., depth information, color information, etc.) related to the acquisition process of the point cloud video.

The point cloud content providing system (e.g., the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (e.g., the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (e.g., signaling information related to the geometry encoding and the attribute encoding). The point cloud content providing system may encapsulate a bitstream that carries the encoded point cloud data and transmit the same in the form of a file or segment.

The point cloud content providing system (e.g., the reception device 10004 or the receiver 10005) according to the embodiments may receive the bitstream containing the encoded point cloud data. In addition, the point cloud content providing system (e.g., the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (e.g., the reception device 10004 or the point cloud video decoder 10005) may decode the point cloud video data based on the signaling information related to encoding of the point cloud video data contained in the bitstream. The point cloud content providing system (e.g., the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (e.g., the reception device 10004 or the point cloud video decoder 10005) may reconstruct the point cloud video based on the positions according to the reconstructed geometry and the decoded attributes.

The point cloud content providing system according to the embodiments (e.g., the reception device 10004 or the renderer 10007) may render the decoded point cloud data (20004). The point cloud content providing system (e.g., the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (e.g., the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
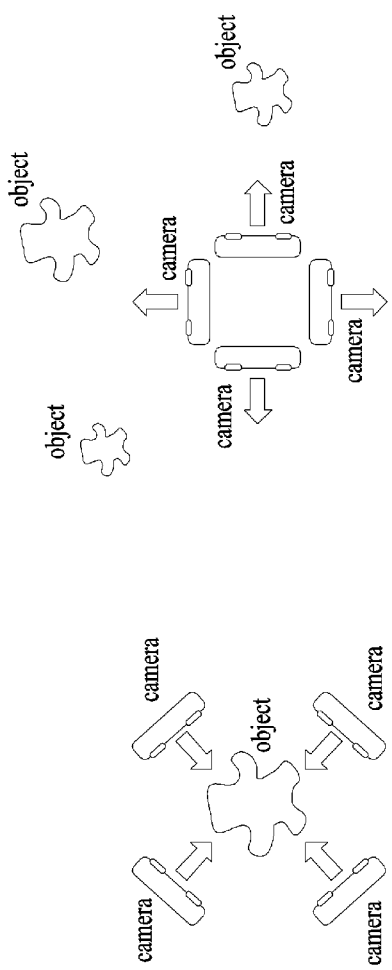
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (e.g., a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
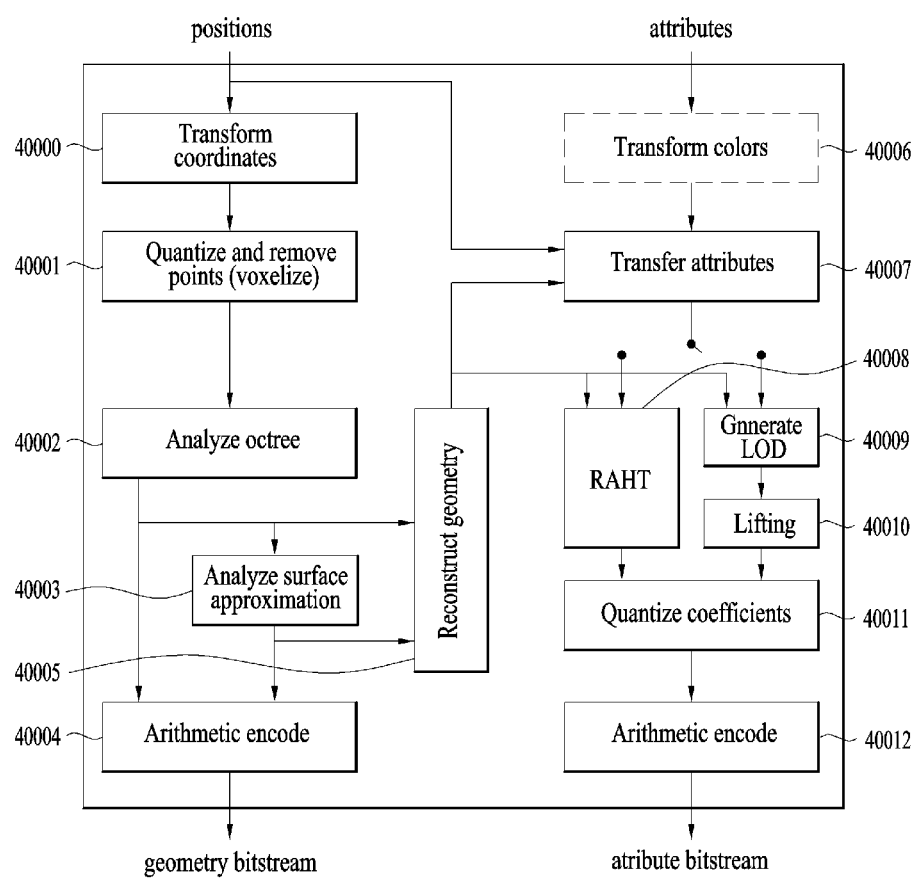
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, predictive tree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (e.g., a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (e.g., a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree, the predictive tree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) may be performed quickly. The Morton code is generated by presenting coordinates (e.g., (x, y, z)) representing 3D positions of all points as bit values and mixing the bits. For example, when the coordinates indicating the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
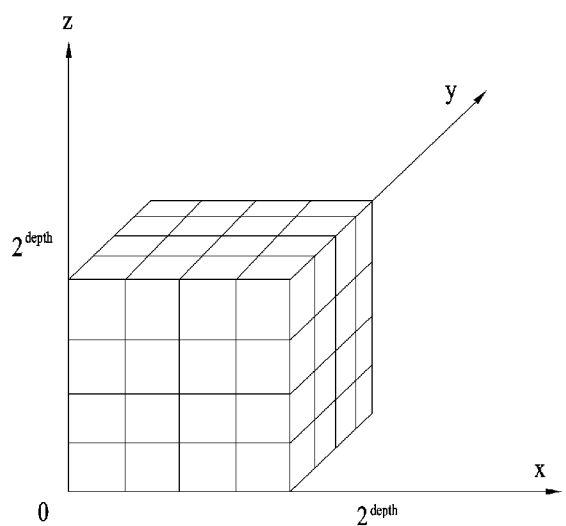
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and ($2^d$, $2^d$, $2^d$) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

Figure 6:
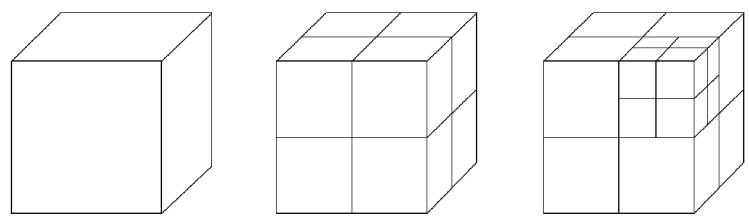
FIG. 6 shows an example of an octree and occupancy code according to embodiments.
Figure 6:
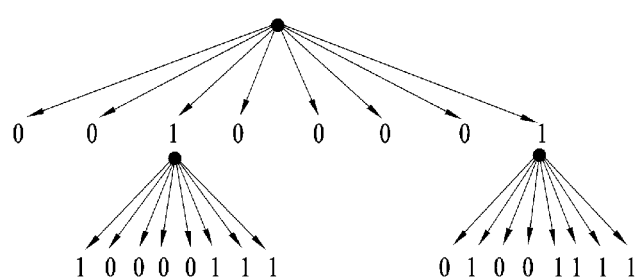

FIG. 6 shows an example of an octree and occupancy code according to embodiments.

As described with reference to FIGS. 1 to 4, the point cloud content providing system (point cloud video encoder 10002) or the point cloud encoder (e.g., the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$). Here, 2d may be set to a value constituting the smallest bounding box surrounding all points of the point cloud content (or point cloud video). Here, d denotes the depth of the octree. The value of d is determined in the following equation. In the following equation, ($x^{int}_n$, $y^{int}_n$, $z^{int}_n$) denotes the positions (or position values) of quantized points.

$$d = \text{Ceil}(\text{Log } 2(\text{Max}(x^{int}_n, y^{int}_n, z^{int}_n, n=1, \ldots, N)+1))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (e.g., the arithmetic encoder 40004) according to the embodiments may perform entropy encoding on the occupancy codes. In order to increase the compression efficiency, the point cloud encoder may perform intra/inter-coding on the occupancy codes. The reception device (e.g., the reception device 10004 or the point cloud video decoder 10006) according to the embodiments reconstructs the octree based on the occupancy codes.

The point cloud encoder (e.g., the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (e.g., the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector ($\Delta x$, $\Delta y$, $\Delta z$) of the edge, and the vertex position value (relative position value within the edge). When the trisoup geometry encoding is applied, the point cloud encoder according to the embodiments (e.g., the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\text{i)} \begin{bmatrix} \mu_x \\ \mu_y \\ \mu_z \end{bmatrix} = \frac{1}{n} \sum_{i=1}^{n} \begin{bmatrix} x_i \\ y_i \\ z_i \end{bmatrix};$$

$$\text{ii)} \begin{bmatrix} \bar{x}_i \\ \bar{y}_i \\ \bar{z}_i \end{bmatrix} = \begin{bmatrix} x_i \\ y_i \\ z_i \end{bmatrix} - \begin{bmatrix} \mu_x \\ \mu_y \\ \mu_z \end{bmatrix};$$

$$\text{iii)} \begin{bmatrix} \sigma_x^2 \\ \sigma_y^2 \\ \sigma_z^2 \end{bmatrix} = \sum_{i=1}^{n} \begin{bmatrix} \bar{x}_i^2 \\ \bar{y}_i^2 \\ \bar{z}_i^2 \end{bmatrix}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through atan2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

Triangles formed from vertices ordered 1, . . . , n n triangles 3 (1,2,3)

4 (1,2,3), (3,4,1)

5 (1,2,3), (3,4,5), (5,1,3)

6 (1,2,3), (3,4,5), (5,6,1), (1,3,5)

7 (1,2,3), (3,4,5), (5,6,7), (7,1,3), (3,5,7)

8 (1,2,3), (3,4,5), (5,6,7), (7,8,1), (1,3,5), (5,7,1)

9 (1,2,3), (3,4,5), (5,6,7), (7,8,9), (9,1,3), (3,5,7), (7,9,3)

10 (1,2,3), (3,4,5), (5,6,7), (7,8,9), (9,10,1), (1,3,5), (5,7,9), (9,1,5)

11 (1,2,3), (3,4,5), (5,6,7), (7,8,9), (9,10,11), (11,1,3), (3,5,7), (7,9,11), (11,3,7)

12 (1,2,3), (3,4,5), (5,6,7), (7,8,9), (9,10,11), (11,12,1), (1,3,5), (5,7,9), (9,11,1), (1,5,9)

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

Figure 7:
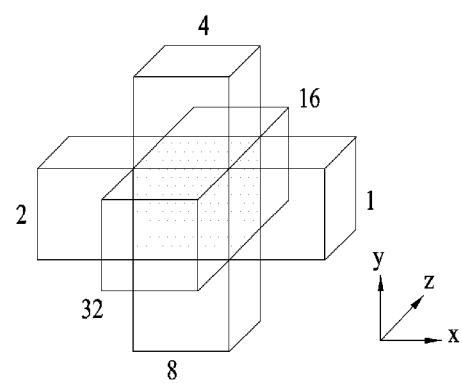
FIG. 7 shows an example of a neighbor node pattern according to embodiments.
Figure 7:
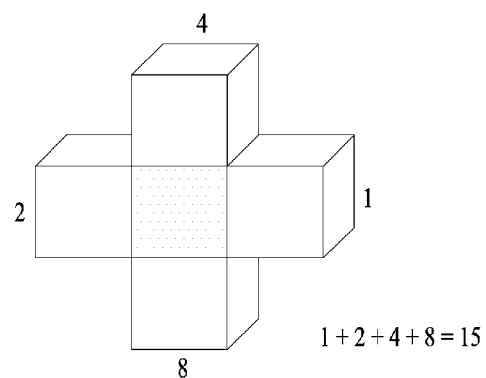

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (e.g., the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The upper part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The lower part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
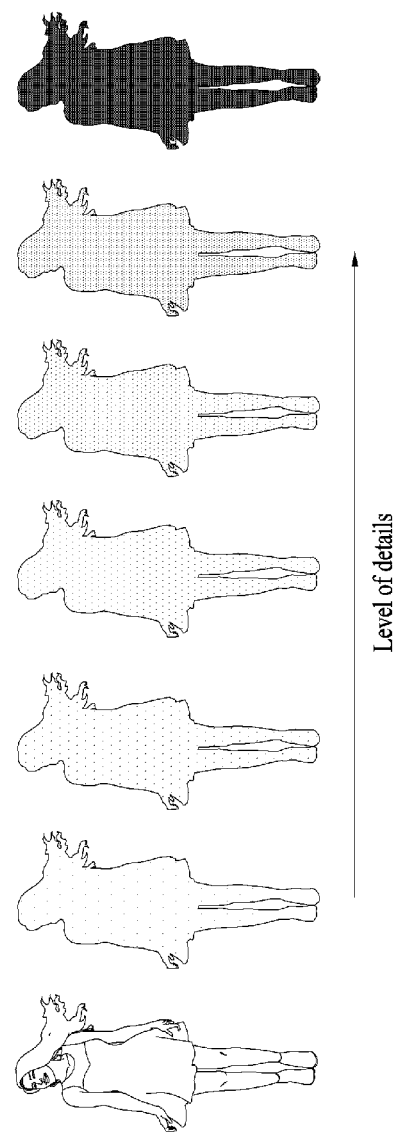
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, upsampling, and voxelization. Since the attribute depends on the geometry, attribute encoding is performed based on the reconstructed geometry.

The point cloud encoder (e.g., the LOD generator 40009) may reorganize points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
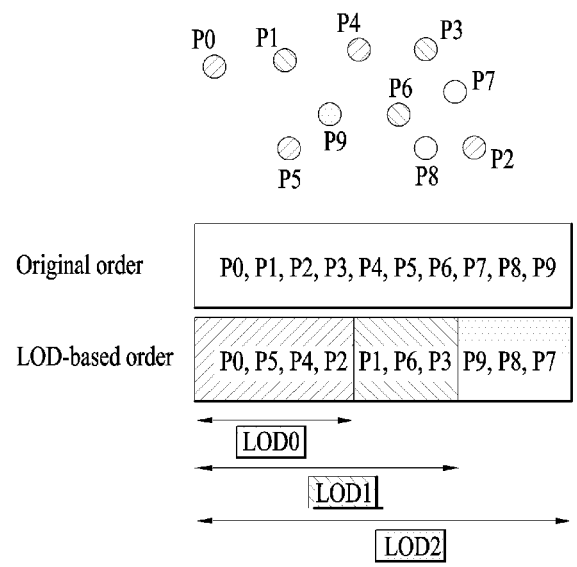
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (e.g., the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (e.g., the coefficient quantizer 40011) may quantize and inversely quantize the residuals (which may be called residual attributes, residual attribute values, attribute residuals or attribute prediction residuals) obtained by subtracting a predicted attribute (attribute value) from the attribute (attribute value) of each point. The quantization process is configured as shown in the following table.

TABLE 1

Attribute prediction residuals quantization pseudo code

```
int PCCQuantization(int value, int quantStep) {
if( value >=0) {
return floor(value / quantStep + 1.0 / 3.0);
} else {
return -floor(-value / quantStep + 1.0 / 3.0);
}
}
```

TABLE 2

Attribute prediction residuals inverse quantization pseudo code

```
int PCCInverseQuantization(int value, int quantStep) {
if( quantStep ==0) {
return value;
} else {
return value * quantStep;
}
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (e.g., the arithmetic encoder 40012) may perform entropy coding on the attributes of the corresponding point without performing the above-described operation.

The point cloud encoder according to the embodiments (e.g., the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (e.g., the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1 = w_{l_{2x,y,z}}$ and $w2 = w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix}, T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (e.g., encoding by the arithmetic encoder 400012). The weights are calculated as $w_{l-1_{x,y,z}} = w_{l_{2x,y,z}} + w_{l_{2x+1,y,z}}$. The root node is created through the $g_{l_{0,0,0}}$ and $g_{l_{0,0,1}}$ as follows.

$$\begin{bmatrix} gDC \\ h_{0_{0,0,0}} \end{bmatrix} = T_{w1000w1001} \begin{bmatrix} g_{l_{0,0,0z}} \\ g_{l_{0,0,1}} \end{bmatrix}$$

The value of gDC is also quantized and subjected to entropy coding like the high-pass coefficients.

Figure 10:
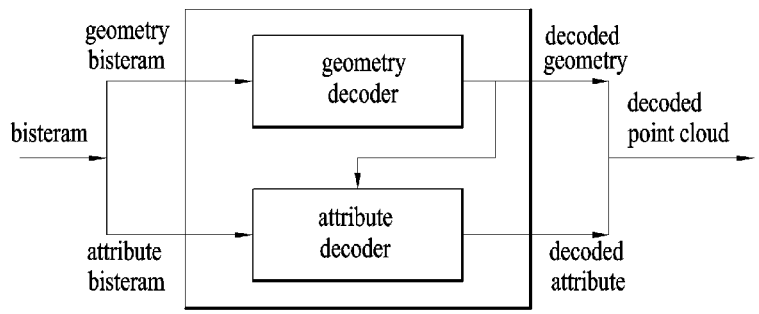
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
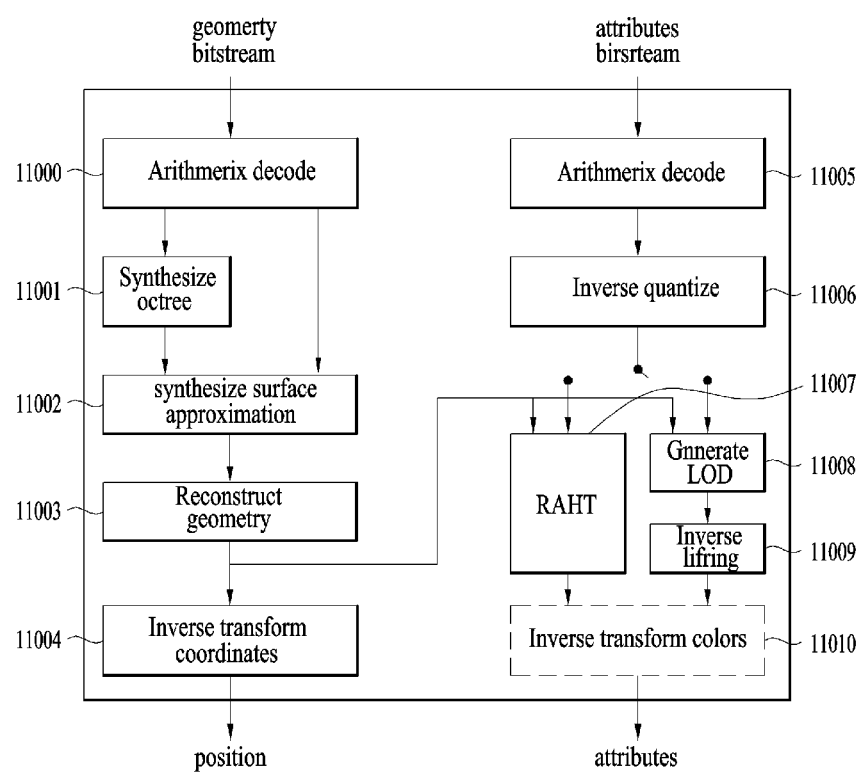
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct decoding and trisoup geometry decoding. The direct decoding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
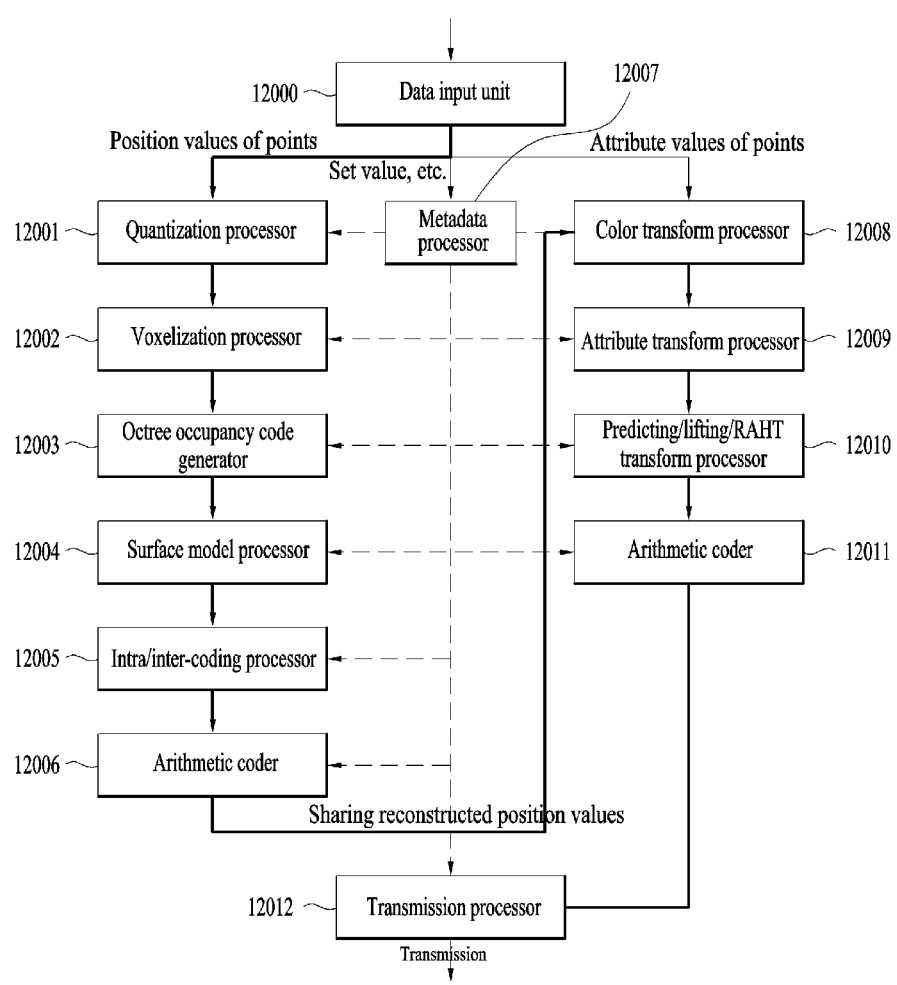
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 12002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same as or similar to the operation and/or method of the point cloud encoder (e.g., the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. A detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. A detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom0$^0$ and one or more attribute bitstreams Attr0$^0$ and Attr1$^0$.

A slice refers to a series of syntax elements representing the entirety or part of a coded point cloud frame.

The TPS according to the embodiments may include information about each tile (e.g., coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
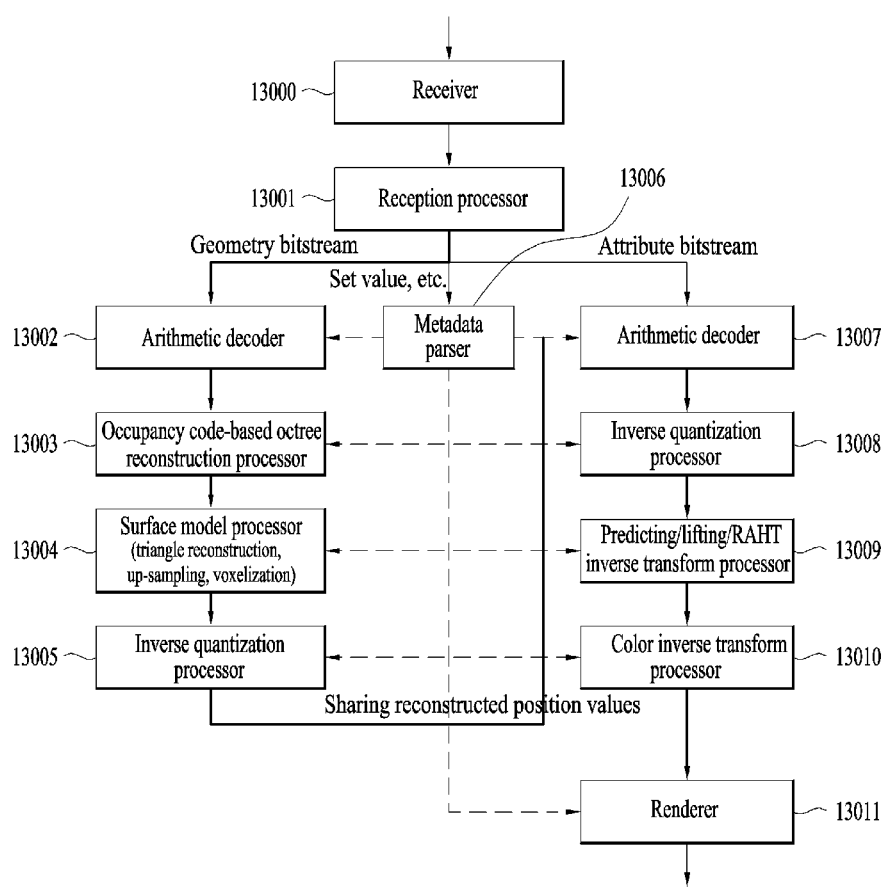
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform a reverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 13005 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (e.g., triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transform processor 13009 according to the embodiments may process the reconstructed geometry and the inversely quantized attributes. The prediction/lifting/RAHT inverse transform processor 13009 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
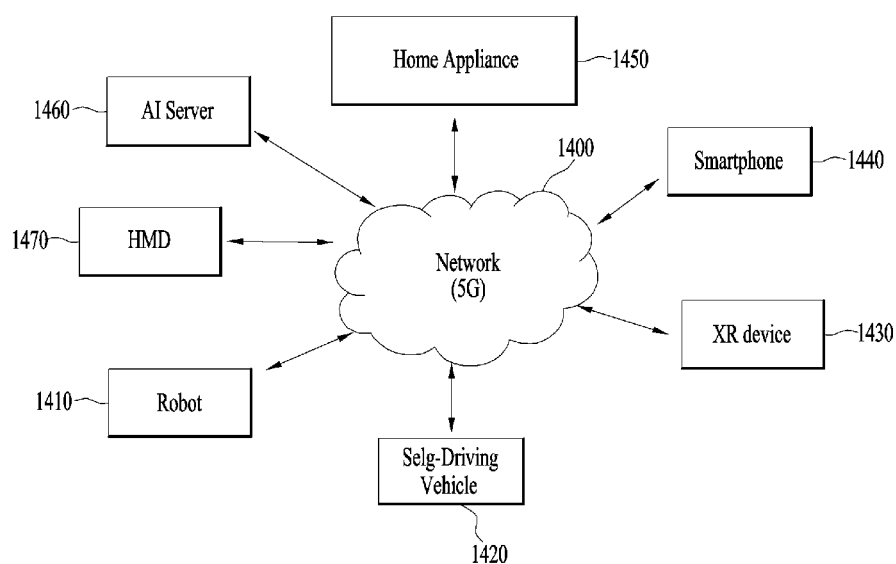
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile Phone>

The XR/PCC device 1430 may be implemented as a mobile phone 1440 by applying PCC technology.

The mobile phone 1440 may decode and display point cloud content based on the PCC technology.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

As described with reference to FIGS. 1 to 14, point cloud data is composed of a set of points, and each point may have geometry information and attribute information. The geometry information is information on the three-dimensional position (e.g., coordinates on the x, y, and z axes) of each point. In other words, the position of each point is represented by parameters of a coordinate system representing three-dimensional space (e.g., parameters (x, y, z) of the X-axis, Y-axis, and Z-axis, which are three axes representing space). The geometry information may be represented as (r, θ, z) of the cylindrical coordinate system or (r, θ, Φ) of the spherical coordinate system according to the coordinate system.

In addition, the attribute information may be a vector of values acquired by one or more sensors, such as the color (RGB, YUV, etc.), reflectance, normal vectors, transparency, brightness, temperature, and the like of a point. The attribute information may be expressed in the form of a scalar or vector.

According to embodiments, the point cloud data may be classified into category 1 of static point cloud data, category 2 of dynamic point cloud data, and category 3, which is acquired through dynamic movement, according to the type of the point cloud data and acquisition method therefor. Category 1 is composed of a point cloud of a single frame with a high density of points for an object or space. The data of category 3 may be divided into frame-based data having multiple frames acquired through movement and fused data of a single frame acquired by matching a point cloud acquired through a LiDAR sensor and a color image acquired as a 2D image for a large space. In addition, for data in Category 1, the color may constitute attribute information. For data in Category 3, the color, reflectance, and color+reflectance values may constitute attribute information according to the characteristics of the content.

Figure 15:
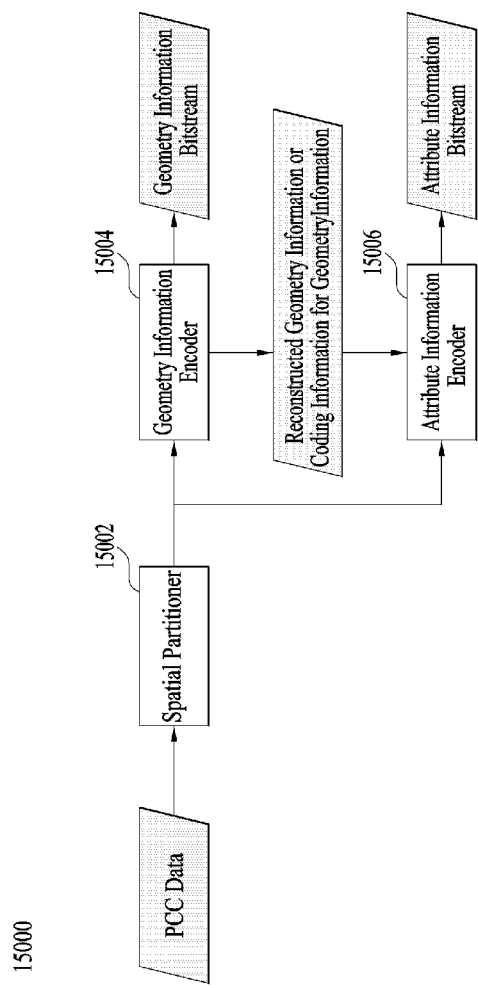
FIG. 15 is a block diagram illustrating an exemplary point cloud encoder according to embodiments.

FIG. 15 is a block diagram illustrating an exemplary point cloud encoder according to embodiments.

The point cloud encoder 15000 (e.g., the point cloud encoder or transmission device described with reference to FIGS. 1, 4, 12, 17, 19, and 35) according to the embodiments may perform the encoding operation described with reference to FIGS. 1 to 14. The point cloud encoder 15000 may include a spatial partitioner 15002, a geometry information encoder (or geometry encoder) 15004, and an attribute information encoder (or attribute encoder) 15006. Although not shown in FIG. 15, the point cloud encoder 15000 may further include one or more elements to perform the encoding operation described with reference to FIGS. 1 to 14.

Point cloud compression (PCC) data (or PCC data or point cloud data) is input data to the point cloud encoder 15000 and may include geometry information and/or attribute information. The geometry information according to the embodiments is information indicating the position (e.g., location) of a point, and may be represented as parameters of a coordinate system such as a Cartesian coordinate system, a cylindrical coordinate system, or a spherical coordinate system. The attribute information according to the embodiments is information indicating the attribute of each point. The attribute information according to the embodiments may include one or more of a color (e.g., RGB vector, YcbCr vector), a brightness value, a temperature value, and a LiDAR reflection coefficient of the point. The attribute information may be acquired by one or more sensors.

The spatial partitioner 15002 may partition PCC data into one or more 3D blocks in a 3D space to store point information of the PCC data. A block according to the embodiments may represent at least one of a coding unit (CU), a prediction unit (PU), or a transformation unit (TU). The spatial partitioner 15002 may perform the partitioning operation based on at least one of an octree, a quadtree, a binary tree, a triple tree, or a k-d tree. Further, the spatial partitioner 15002 may partition the space into blocks of predetermined width, length, and height, or may partition the space by selectively determining the locations and sizes of the blocks. The input PCC data may be divided into groups of voxels, such as slices, tiles, bricks, subframes, etc. Further, the spatial partitioner 15002 may partition the space equally or unequally along one or more axes in a Cartesian coordinate system (x, y, z), a cylindrical coordinate system (r, θ, z), or a spherical coordinate system (r, θ, φ). A block may contain one or more points.

The geometry information encoder (or the geometry encoder) 15004 according to the embodiments may encode the geometry information to generate a geometry bitstream and reconstructed geometry information. The encoding may be performed per entire cloud, per subcloud, or per encoding unit, and inter-frame prediction (inter-prediction) or intra-frame prediction (intra-prediction) may be selected per encoding unit. In addition, the inter-predition mode or intra-predition mode may be selected for each prediction unit. The bitstream generated by the geometry information encoder 15004 may be transmitted to a point cloud data reception device according to embodiments. The reconstructed geometry information may be input to the attribute information encoder 15006.

The geometry information encoder 15004 according to the embodiments may perform the operations of the coordinate transformer (Transformation Coordinates) 40000, the quantizer (Quantize and Remove Points (Voxelize)) 40001, and the octree analyzer (Analyze Octree, 40002), the surface approximation analyzer (Analyze Surface Approximation) 40003, the arithmetic encoder (Arithmetic Encode) 40004, and the geometry reconstructor (Reconstruct Geometry) 40005 described with reference to FIG. 4. In addition, the geometry information encoder 15004 according to the embodiments may perform the operations of the data input unit 12000, the quantization processor 12001, the voxelization processor 12002, the octree occupancy code generator 12003, the surface model processor 12004, the intra/inter-coding processor 12005, the arithmetic coder 12006, the metadata processor 12007, the color transform processor 12008, the attribute transform processor 12009, the prediction/lifting/RAHT transform processor 12010, and the arithmetic coder 12011 described with reference to FIG. 12.

The attribute information encoder 15006 may generate an attribute information bitstream based on the reconstructed geometry information. The generated geometry information bitstream and attribute information bitstream may be compressed into a bitstream and transmitted to a point cloud data reception device according to embodiments. The compressed bitstream may contain signaling information (metadata, parameter information, etc.) related to the geometry information bitstream and the attribute information bitstream.

Figure 16:
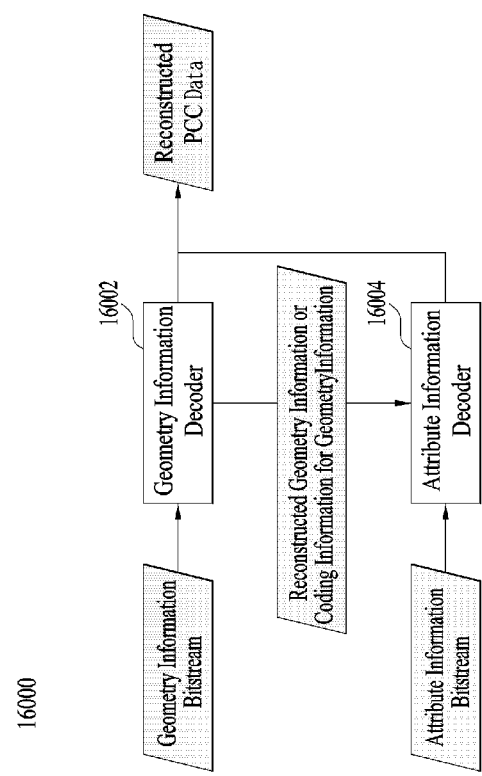
FIG. 16 is a block diagram illustrating an exemplary point cloud decoder according to embodiments.

FIG. 16 is a block diagram illustrating an exemplary point cloud decoder according to embodiments.

The point cloud decoder 16000 (e.g., the point cloud decoder or reception device described with reference to FIGS. 1, 10, 11, 13, 18, 20, and 36) according to the embodiments may perform the decoding operation described with reference to FIGS. 1 to 14. In addition, the point cloud decoder 16000 may perform a decoding operation corresponding to the reverse process of the encoding operation of the point cloud encoder 15000 described with reference to FIG. 15. The point cloud decoder 16000 may include a spatial partitioner (not shown), a geometry information decoder 16002, and an attribute information decoder (or attribute decoder) 16004. Although not shown in FIG. 16, the point cloud decoder 16000 may further include one or more elements to perform the decoding operation described with reference to FIGS. 1 to 14.

The spatial partitioner according to the embodiments may partition the space based on the signaling information (e.g., information on the partitioning operation performed by the spatial partitioner 15002 described with reference to FIG. 15, a subcloud determined by the encoder, and/or partitioning information about an encoding/decoding unit (CU), a prediction unit (PU), or a transformation unit (TU)) received from the point cloud data transmission device (e.g., the point cloud data transmission device described with reference to FIGS. 1, 4, 12, 17, 19, and 35), or partitioning information derived (generated) by the point cloud decoder 16000. The CU, the PU, or the TU may have the same partitioning structure or different partitioning structures according to embodiments. The partitioning operation of the spatial partitioner of the point cloud decoder 16000 may be based on at least one of an octree, a quad tree, a binary tree, a triple tree, or a k-d tree.

The geometry information decoder 16002 may decode the input geometry bitstream and reconstruct geometry information. The reconstructed geometry information may be input to the attribute information decoder 16004. The geometry information decoder 16002 may perform the operations of the arithmetic decoder (arithmetic decode) 11000, the octree synthesizer (Synthesize octree) 11001, and the surface approximation synthesizer (Synthesize surface approximation) 11002, the geometry reconstructor (Reconstruct geometry) 11003, and the coordinate inverse transformer (Inverse transform coordinates) 11004 described with reference to FIG. 11. Also, the geometry information decoder 16002 may perform the operations of the arithmetic decoder 13002, the occupancy code-based octree reconstruction processor 13003, and the surface model processor (triangle reconstruction, up-sampling, voxelization) 13004, and the inverse quantization processor 13005 described with reference to FIG. 13.

The geometry information decoder 16002 may perform decoding for the entire cloud or in units of subclouds or CUs, and may receive a flag indicating whether intra-frame prediction or inter-frame prediction is performed for each CU and determine the intra-frame prediction or inter-frame prediction. Accordingly, the decoder may receive mode information about intra-frame prediction or inter-frame prediction for each PU and perform prediction.

The attribute information decoder 16006 may reconstruct attribute information based on the attribute information bitstream and the reconstructed geometry information. The attribute information decoder 16004 may perform decoding for the entire cloud or for each subcloud or CU, and may receive a flag indicating whether intra-frame prediction or inter-frame prediction is performed for each CU and determine the intra-frame prediction or inter-frame prediction. Accordingly, the decoder may receive mode information about intra-frame prediction or inter-frame prediction for each PU and perform prediction. According to an embodiment, the attribute information decoder 16004 may be omitted. The point cloud decoder 16000 may output reconstructed PCC data based on the reconstructed geometry information and the reconstructed attribute information.

According to embodiments, the attribute information decoder 16004 may decode the input attribute bitstream to reconstruct the attribute information. The attribute information decoder 16004 may receive input of reconstructed geometry information or encoding information for the geometry information and restore the attribute information. The restored attribute information may be composed of point cloud data (PCC data) reconstructed together with the reconstructed geometry information.

The attribute information decoder 16004 may perform the operations of the arithmetic decoder 11005, the inverse quantizer 11006, the RAHT transformer 11007, the LOD generator 11008, the inverse lifter 11009, and the color inverse transformer 11010 described with reference to FIG. 11. In addition, the attribute information decoder 16004 may perform the operations of the arithmetic decoder 13007, the inverse quantization processor 13008, the prediction/lifting/RAHT inverse transform processor 13009, and the color inverse transform processor 13010.

Figure 17:
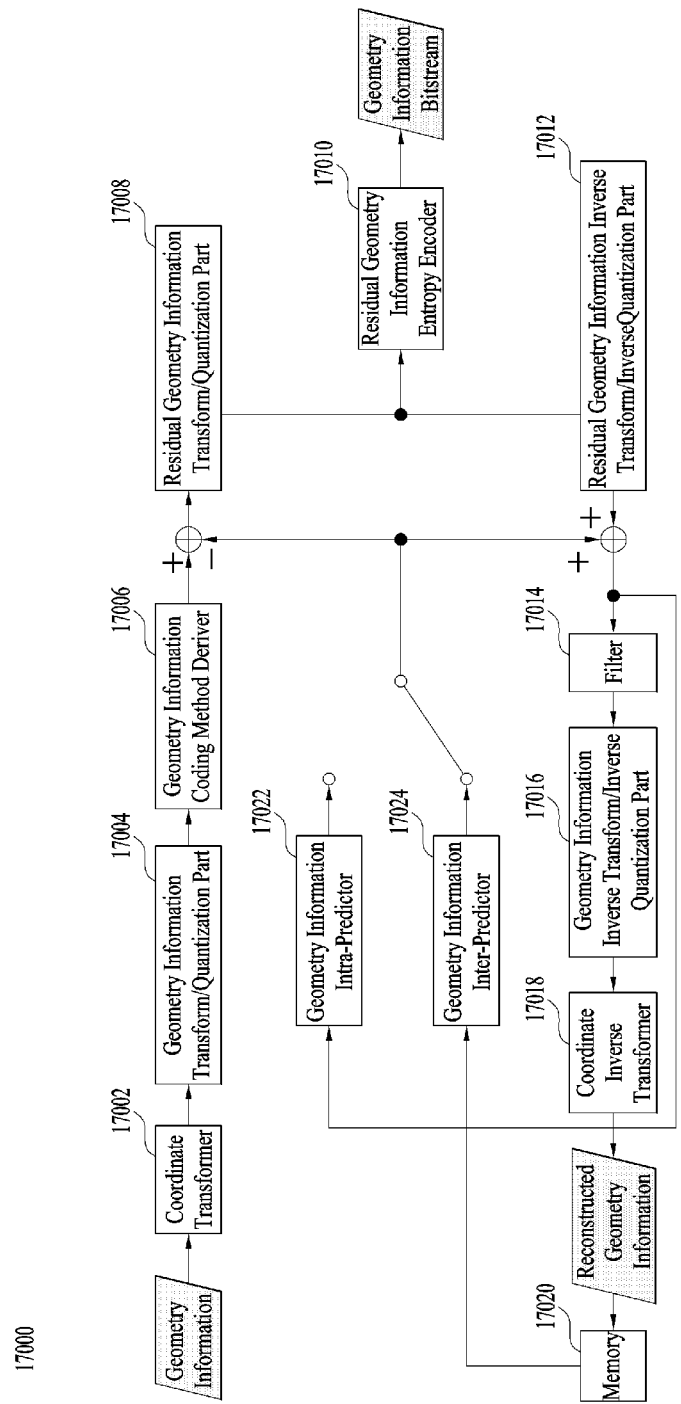
FIG. 17 is a block diagram illustrating an exemplary geometry information encoder (geometry encoder) according to embodiments.

FIG. 17 is a block diagram illustrating an exemplary geometry information encoder (or geometry encoder) according to embodiments.

The geometry information encoder (or geometry encoder) 17000 according to the embodiments, which is an example of the geometry information encoder 15004 in FIG. 15, may perform the operations of the geometry information encoder 15004. The geometry information encoder 17000 may include a coordinate transformer 17002, a geometry information transform/quantization part 17004, a geometry information coding method deriver 17006, a residual geometry information transform/quantization part 17008, a geometry information entropy encoder 17010, a residual geometry inverse transform/inverse quantization part 17012, a filter 17014, a geometry inverse transform/inverse quantization part 17016, a coordinate inverse transformer 17018, a memory 17020, a geometry information intra-predictor 17022, or a geometry information inter-predictor 17024.

Although not shown in FIG. 17, the geometry information encoder 17000 may further include one or more elements to perform the geometry encoding operation described with reference to FIGS. 1 to 15. In addition, each component of the geometry information encoder 17000 may be composed of hardware, software, a processor, and/or a combination thereof.

The geometry information encoder 17000 may partition the geometry information into slices, tiles, bricks, subframes, or the like. The geometry information may be input to the coordinate transformer 17002 on a frame-by-frame or partitioned geometry basis. The geometry information encoder 17000 may include a geometry information partitioner (not shown) that partsitions the geometry information.

The coordinate transformer 17002 may transform the coordinate system of 3D spatial position information about each point represented by the input geometry information into another coordinate system. The coordinate system may include, but is not limited to, a 3D Cartesian coordinate system, a cylindrical coordinate system, and a spherical coordinate system. The coordinate transformer 17002 may not perform coordinate transformation. The coordinate—transformed geometry information is input to the geometry information transform/quantization part 17004.

The coordinate transformation status and the coordinate information may be signaled per unit, such as a sequence, frame, tile, slice, or block, or may be derived based on a coordinate transformation status of a neighbor block, the size of the block, the number of points, the quantization value, the block partition depth, the position of the unit, and the distance between the unit and the origin.

When coordinate transformation is performed after checking whether to perform coordinate transformation, coordinate information to be transformed may be signaled per unit such as sequence, frame, tile, slice, or block. Alternatively, the coordinate information may be derived based on a coordinate transformation status of a neighbor block, the size of the block, the number of points, the quantization value, the block partition depth, the position of the unit, and the distance between the unit and the origin.

Upon receiving geometry information as an input, the geometry information transform/quantization part 17004 applies one or more transformations, such as position transformation or rotation transformation, divides the geometry information by a quantization value and performs quantization to generate transformed quantized geometry information. The transformed quantized geometry information may be input to a geometry information node splitter.

The geometry information transform/quantization part 17004 may quantize the geometry information presented in the coordinate system and generate transformed quantized geometry information. The geometry information transform/quantization part 17004 may apply one or more transformations, such as position transformation and/or rotation transformation, to the positions of points indicated by the geometry information output from the coordinate transformer 17002, and perform quantization by dividing the transformed geometry information by a quantization value. The quantization value may vary based on a distance between a coding unit (e.g., a tile, a slice, etc.) and the origin of the coordinate system or an angle from a reference direction. The quantization value may be a preset value.

The geometry information coding method deriver 17006 may receive transformed quantized geometry information in a unit such as a frame, slice, or tile as input and derive or determine coding information such as a partition mode or coding mode of the geometry information. The geometry information coding method deriver 17006 may generate geometry information coding information.

The geometry information predictor according to the embodiments includes a geometry information intra-predictor 17022 and a geometry information inter-predictor 17024.

The geometry intra-predictor 17022 generates predicted geometry information by predicting geometry from previously reconstructed geometry in the same frame. The prediction information used for prediction may be encoded by performing entropy encoding.

The geometry information inter-predictor 17024 generates predicted geometry information by predicting geometry information through previously reconstructed geometry information of another frame in the memory 17020. The prediction information used for prediction may be encoded by performing entropy encoding.

The geometry information predictor may calculate a predicted value (or predicted geometry information) based on the quantization value of a neighbor coding unit. In addition, the geometry information predictor may generate predicted geometry information based on information related to generation of the predicted geometry information or the reconstructed geometry information. The geometry information inter-predictor 17024 may perform inter-frame prediction (inter-prediction) on the current PU (e.g., node, etc.) based on information included in at least one of the previous space or the subsequent space of the current space (e.g., frame, picture, etc.) containing the current PU based on information required for inter-frame prediction of the current PU. The geometry information intra-predictor 17022 may generate predicted geometry information based on geometry information about points in the current space based on information related to intra-frame prediction.

The residual geometry information transform/quantization part 17008 may receive the residual geometry information, which is the difference between the geometry information and the predicted geometry information, and may transform or quantize the residual geometry information with a quantization value to generate quantized residual geometry information. The quantized residual geometry information may be input to the geometry information entropy encoder 17010 and the residual geometry information inverse transform/inverse quantization part 17012.

The geometry entropy encoder 17010 may receive the quantized residual geometry information, the predicted geometry information, and the like, and entropy-encode the same. The entropy encoding according to the embodiments may include exponential Golomb, context-adaptive variable length coding (CAVLC), and context-adaptive binary arithmetic coding (CABAC).

The residual geometry information inverse transform/inverse quantization part 17012 may reconstruct residual geometry information by scaling the quantized geometry information with a quantization value. The reconstructed residual geometry information and the predicted geometry information may be added to generate reconstructed geometry information, and the reconstructed geometry information may be stored in the memory 17020. The reconstructed geometry information may be provided to the geometry information predictor so as to be used for inter-frame prediction or intra-prediction of geometry information. The residual geometry information inverse transform/inverse quantization part 17012 may be referred to as a residual geometry reconstructor.

The filter 17014 may filter the reconstructed geometry information. The filter 17014 may include a deblocking filter, an offset corrector, and an ALF. According to embodiments, the filter 17014 may be omitted.

The geometry information inverse transform/inverse quantization part 17016 may multiply the reconstructed geometry information by the quantization value used by the geometry information transform/quantization part 17004 to generate reconstructed and inversely quantized geometry information. The geometry information inverse transform/inverse quantization part 17016 may be executed before being stored in the memory 17020 or after being stored in the memory 17020.

The coordinate inverse transformer 17018 may inversely transform the coordinate system of the reconstructed geometry information to the coordinate system before the transformation is performed by the coordinate transformer 17002.

The memory 17020 may store the geometry information calculated by the filter 17014 or prior to filtering. The stored geometry information may be provided to geometry information inter-predictor 17024 or geometry information intra-predictor 17022 when performing a prediction.

Figure 18:
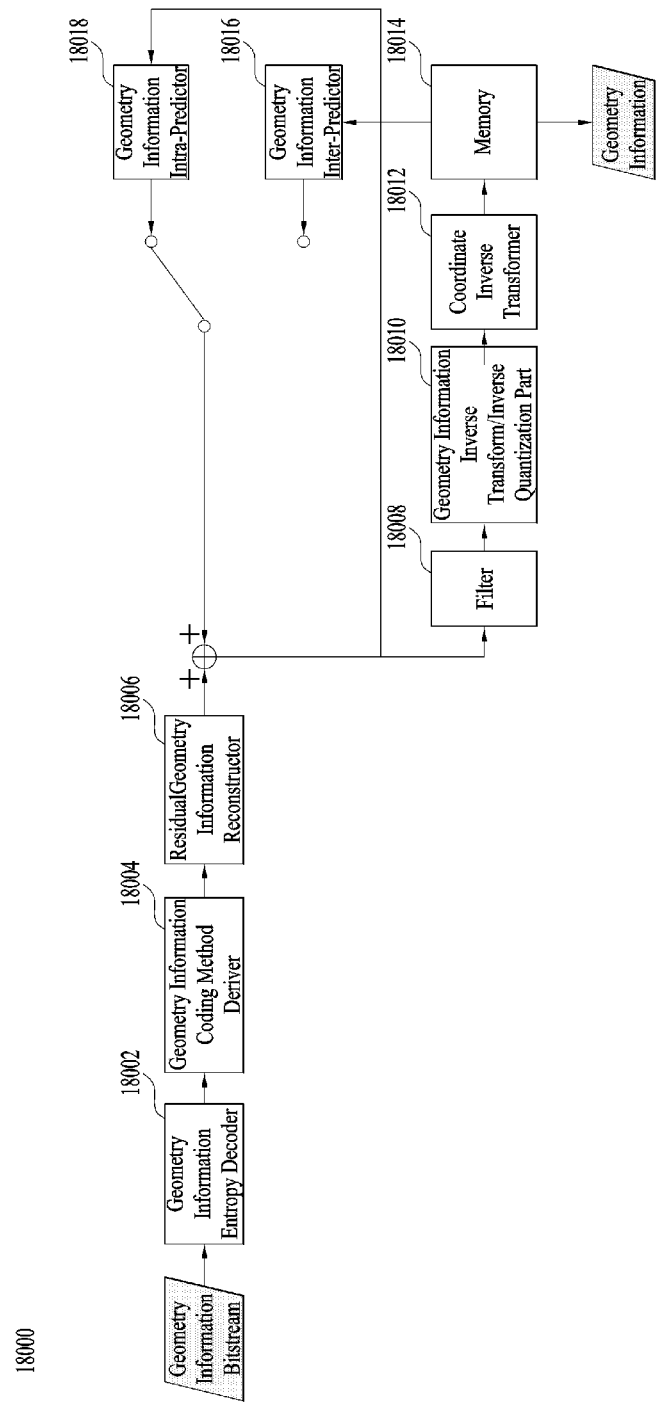
FIG. 18 is a block diagram illustrating an exemplary geometry information decoder (geometry decoder) according to embodiments.

FIG. 18 is a block diagram illustrating an exemplary geometry information decoder (geometry decoder) according to embodiments.

The geometry information decoder 18000 according to the embodiments, which is an example of the geometry information decoder 16002 of FIG. 16, may perform the operation of the geometry information decoder 16002. The geometry information decoder 18000 may perform a decoding operation corresponding to a reverse process of the encoding operation of the geometry information encoder 17000 described with reference to FIG. 17. The geometry information decoder 18000 may include a geometry information entropy decoder 18002, a geometry information coding method deriver 18004, a residual geometry information inverse transform/inverse quantization part 18006, a geometry information predictor, a geometry information inverse transform/inverse quantization part 18010, a filter 18008, a coordinate inverse transformer 18012, or a memory 18014. Although not shown in FIG. 18, the geometry information decoder 18000 may further include one or more elements to perform the geometry decoding operations described with reference to FIGS. 1 to 17. Each component of the geometry information decoder 18000 may correspond to hardware, software, a processor, and/or a combination thereof.

The geometry information entropy decoder 18002 may entropy-decode the input geometry information bitstream. The geometry information entropy decoder 18002 may perform an entropy decoding operation, which is the inverse of the entropy encoding operation performed by the residual geometry information entropy encoder 17010 described with reference to FIG. 17. The entropy encoding operation according to the embodiments may include exponential Golomb, CAVLC, and CABAC, and the entropy decoding operation may include exponential Golomb, CAVLC, and CABAC according to the entropy encoding operation. The geometry information entropy decoder 18002 may decode information related to geometry coding contained in the geometry information bitstream, for example, information related to generation of predicted geometry information, information related to quantization (e.g., a quantization value, etc.), and signaling information related to coordinate transformation. The quantized residual geometry information generated through entropy decoding may be input to the residual geometry information inverse transform/inverse quantization part 18006.

The geometry information coding method deriver 18004 may derive a coding method such as a coding mode or a partition mode of the geometry information, or may derive whether and how to execute the residual geometry information inverse transform/inverse quantization part 18006, the geometry information intra-predictor 18018, and the geometry information inter-predictor 18016 according to the coding method.

The residual geometry information inverse transform/inverse quantization part 18006 may receive quantization parameters or quantized residual geometry information as input, and perform an inverse quantization or inverse transform to reconstruct the residual geometry information. The reconstructed residual geometry information may be summed with the predicted geometry information to reconstruct the geometry information and store the same in the memory 18014. The residual geometry information inverse transform/inverse quantization part 18006 may be referred to as a residual geometry information reconstructor.

The geometry information predictor according to the embodiments includes a geometry information inter-predictor 18016 and a geometry information intra-predictor 18018. The geometry information inter-predictor 18016 and the geometry information intra-predictor 18018 may generate predicted geometry information based on information related to generating predicted geometry information provided by the geometry information entropy decoder 18002 and the previously decoded geometry information provided by the memory 18014. The geometry information inter-predictor 18016 may perform inter-prediction on the current prediction unit based on information contained in at least one of the space before or after the current space containing the current prediction unit, using information required for inter-prediction (inter-frame prediction) of the current prediction unit provided by the encoding device. The geometry information intra-predictor 18018 may generate predicted geometry information based on geometry information about points in the current space. When intra-prediction is performed on a prediction unit, the intra-prediction may be performed based on the intra-prediction mode information for the prediction unit provided by the encoding device. The predicted geometry information may be summed with the reconstructed residual geometry information to generate reconstructed geometry information.

The filter 18008 may filter the reconstructed geometry information generated by adding the predicted geometry information generated based on the filtering-related information to the reconstructed residual geometry information. The filter 18008 may perform filtering based on the characteristics of the filtering-related information provided by the decoder or reconstructed geometry information derived by the decoder. The filtering-related information may be signaled by the geometry information encoder 17000, or may be derived and calculated by the geometry information decoder 18000 in the decoding process.

The geometry information inverse transform/inverse quantization part 18010 may perform an inverse transform or inverse quantization on the filtered or unfiltered reconstructed geometry information.

The coordinate inverse transformer 18012 may perform coordinate inverse transformation based on the coordinate transformation-related information provided by the geometry information entropy decoder 18002 and the reconstructed geometry information stored in the memory 18014. That is, geometry information may be output by inversely transforming the coordinates of the geometry information based on signaling information related to coordinate transformation.

The memory 18014 may store the output geometry information from the filter 18008, the geometry information inverse transform/inverse quantization part 18010, or the coordinate inverse transformer 18012.

Figure 19:
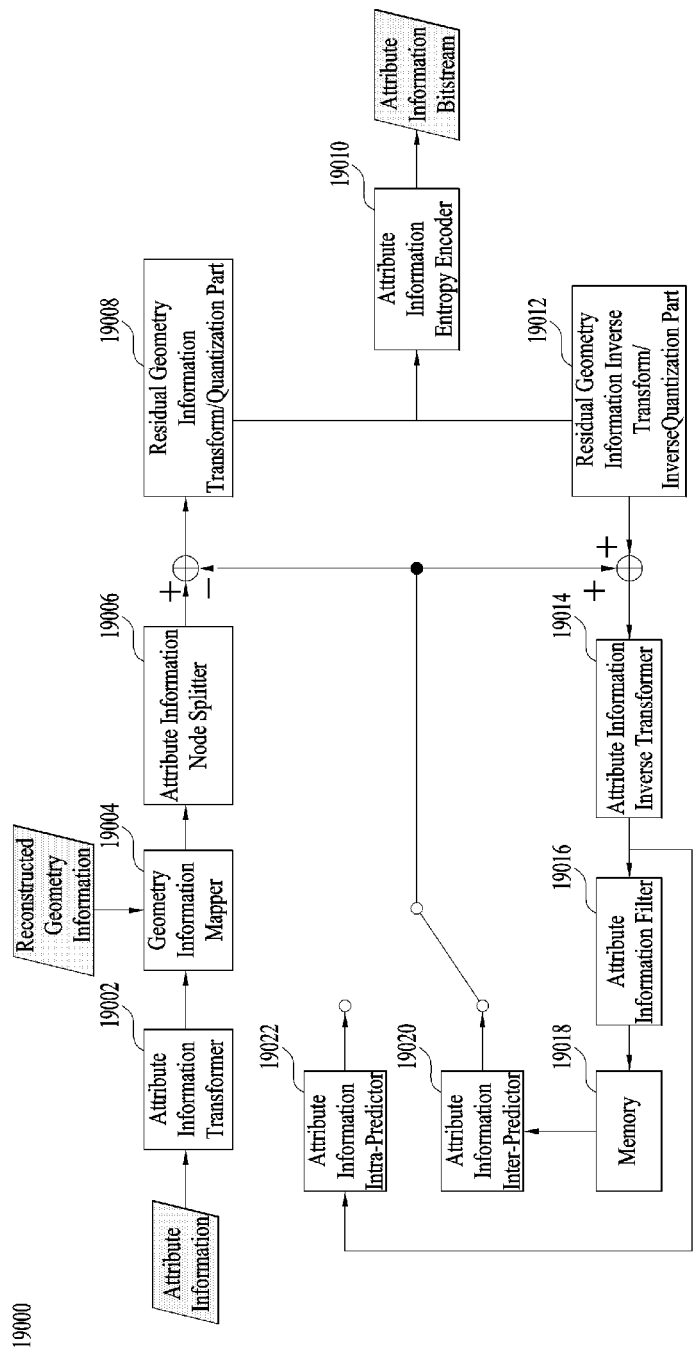
FIG. 19 is a block diagram illustrating an exemplary attribute information encoder (attribute encoder) according to embodiments.

FIG. 19 is a block diagram illustrating an exemplary attribute information encoder (attribute encoder) according to embodiments.

The attribute information encoder 19000 according to the embodiments, which is an example of the attribute information encoder 15006 of FIG. 15, may perform the operation of the attribute information encoder 15006. The attribute information encoder 19000 may include an attribute information transformer 19002, a geometry information mapper 19004, an attribute information node splitter 19006, a residual attribute information transform/quantization part 19008, an attribute information entropy encoder 19010, a residual attribute information inverse transform/inverse quantization part 19012, a filter 19016, an attribute information filter 19016, a memory 19018, and an attribute information predictor. The attribute information predictor may include an attribute information intra-predictor 19022 and an attribute information inter-predictor 19020. Each component of the attribute information encoder 19000 may correspond to hardware, software, a processor, and/or a combination thereof.

When the received attribute information represents a color space, the attribute information transformer 19002 may transform the color space of the attribute information. The attribute information transformer 19002 may transform the attribute information, and the transformed attribute information may be input to the geometry information mapper 19004. The attribute information transformer 19002 may not transform the attribute information.

The geometry information mapper 19004 reconstructs the attribute information by performing mapping between the attribute information and the reconstructed geometry information. The attribute information reconstruction may derive an attribute value based on attribute information of one or a plurality of points based on the reconstructed geometry information. A difference between the reconstructed attribute information and the predicted attribute information generated by the attribute information predictor may be input to the residual attribute information transform/quantization part 19008.

The attribute information node splitter 19006 may split the attribute information input from the geometry information mapper 19004 into nodes.

The residual attribute information transform/quantization part 19008 may transform a residual 3D block containing the residual attribute information using a transform type such as DCT, DST, DST, SADCT, or RAHT. Further, the residual attribute information transform/quantization part 19008 may quantize the transformed residual attribute information. The transform type may be entropy-encoded by the attribute information entropy encoder 19010 and transmitted to the point cloud data reception device (e.g., decoder) according to embodiments. The residual attribute information transform/quantization part 19008 may generate transformed quantized residual attribute information. The transformed quantized residual attribute information may be input to the attribute information entropy encoder 19010 and the residual attribute information inverse transform/inverse quantization part 19012.

The attribute information entropy encoder 19010 may perform entropy encoding on the transformed quantized residual attribute information. The entropy coding includes various encoding methods such as exponential Golomb, CAVLC, and CABAC.

The residual attribute information inverse transform/inverse quantization part 19012 receives the transformed quantized residual attribute information and performs inverse transformation and inverse quantization thereon to generate residual attribute information. The transformed residual attribute information generated after inverse quantization may be input to the residual attribute inverse transformer. The residual attribute information inverse transform/inverse quantization part 19012 may inversely transform the residual 3D block containing the transformed residual attribute information using a transform type such as DCT, DST, DST, SADCT, or RAHT. The inversely transformed residual attribute information may be summed with the predicted attribute information input from the attribute information predictor to generate reconstructed attribute information. Alternatively, reconstructed attribute information may be generated by summing the residual attribute information with the predicted attribute information withtout performing inverse transformation.

The attribute information filter 19016 may include a deblocking filter and an offset corrector. The attribute information filter 19016 may perform filtering on the reconstructed attribute information.

The attribute information inverse transformer 19014 may receive the type of the attribute information and the transformation information from the entropy decoder, and perform various color space inverse transforms such as RGB-YUV and RGB-YUV.

The memory 19018 may store the attribute information calculated by the attribute information filter 19016. The stored attribute information may be provided to the attribute information predictor when performing a prediction.

The attribute information inter-predictor 19020 generates predicted attribute information based on the attribute information about the reconstructed point clouds. The predicted attribute information may be encoded by entropy encoding.

The attribute information intra-predictor 19022 may decode the encoded points in the current point cloud and perform prediction based on the reconstructed points. The prediction attribute information may be encoded by entropy encoding.

The attribute information intra-predictor 19022 and the attribute information inter-predictor 19020 generate predicted attribute information based on the attribute information about the points stored in the memory 19018. The attribute information or geometry information about points in the same or different frames stored in the memory 19018 may be used.

Figure 20:
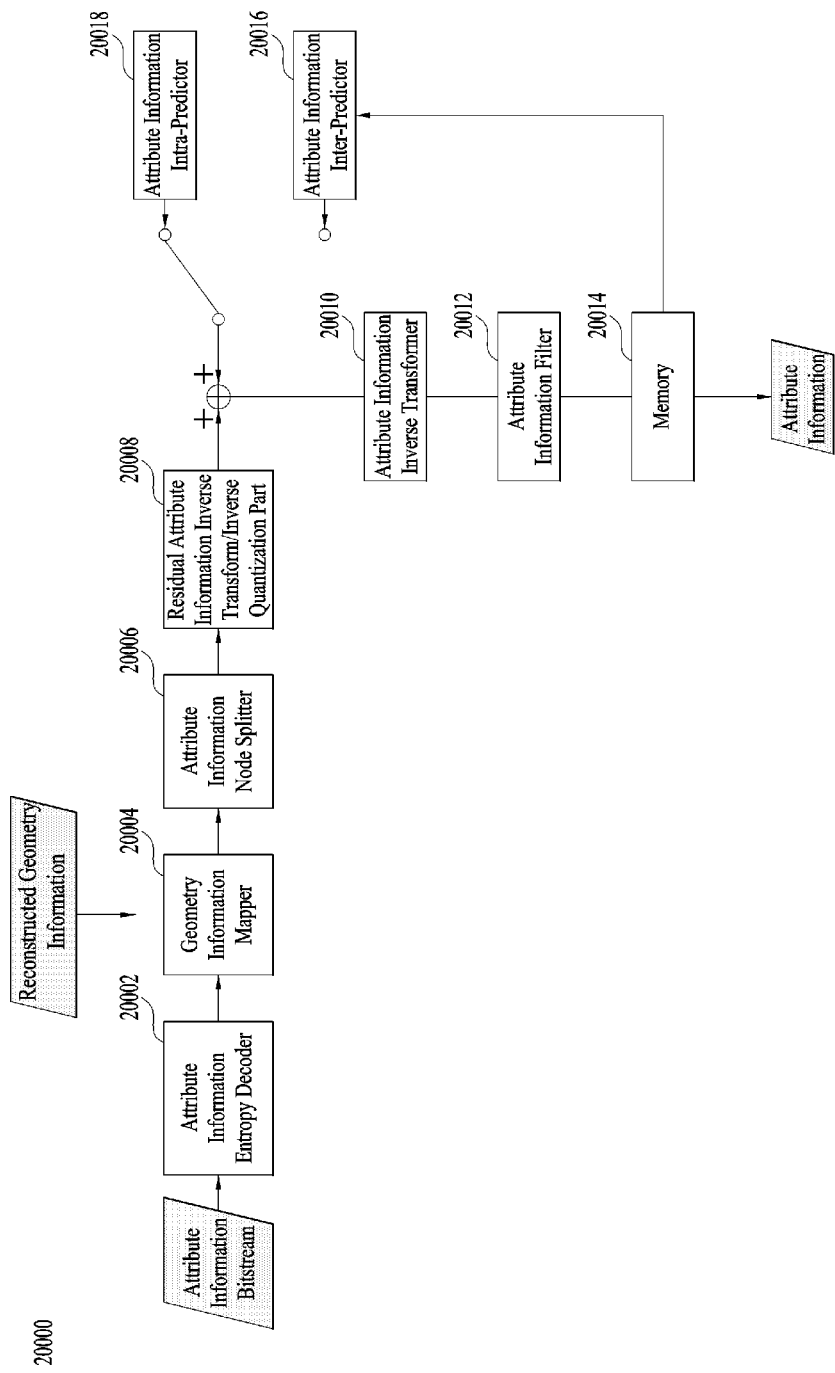
FIG. 20 is a block diagram illustrating an exemplary attribute information decoder (attribute decoder) according to embodiments.

FIG. 20 is a block diagram illustrating an exemplary attribute information decoder (attribute decoder) according to embodiments.

The attribute information decoder 20000, which is an example of the attribute information decoder 16004 of FIG. 16, may perform the operation of the attribute information decoder 16004. According to embodiments, the attribute information decoder 20000 may include an attribute information entropy decoder 20002, a geometry information mapper 20004, an attribute information node splitter 20006, a residual attribute information inverse transform/inverse quantization part 20008, an attribute information intra-predictor 20018, an attribute information inter-predictor 20016, an attribute information inverse transformer 20010, an attribute information filter 20012, or a memory 20014.

Each component of the attribute information decoder 20000 may correspond to hardware, software, a processor, and/or a combination thereof.

The attribute information entropy decoder 20002 receives an attribute information bitstream as input and entropy-decodes the attribute information to generate transformed quantized attribute information. The generated transformed quantized attribute information may be transmitted to the geometry information mapper 20004.

The geometry information mapper 20004 maps the transformed quantized attribute information input from the attribute information entropy decoder 20002 to the reconstructed geometry information. The attribute information mapped to the geometry information may be transmitted to the residual attribute information inverse transform/inverse quantization part 20008.

The attribute information node splitter 20006 parses or derives information for splitting attribute information into units to be predicted, transformed, or quantized. The information for splitting may refer to a split type such as octree, quadtree, or binary tree.

The residual attribute information inverse transform/inverse quantization part 20008 performs inverse quantization based on the quantization value of the transformed quantized attribute information. The residual attribute information inverse transform/inverse quantization part 20008 may generate reconstructed residual attribute information by inverse transforming the inversely quantized transformed residual attribute information.

The residual attribute information inverse transformer may inversely transform a 3D residual block including the transformed residual attribute information using a transform type such as DCT, DST, DST, SADCT, or RAHT. The sum of the inversely transformed residual attribute information and the predicted attribute information generated by the attribute information predictor may be stored in the memory 20014. Alternatively, the residual attribute information may be summed with the predicted attribute information without being inversely transformed, and stored in the memory 20014.

The attribute information intra-predictor 20018 and the attribute information inter-predictor 20016 generate predicted attribute information based on the attribute information about the points stored in the memory 20014. In other words, the attribute information or geometry information about points in the same or different frames stored in the memory 20014 may be used. The predicted information may be encoded by entropy encoding.

The attribute information inverse transformer 20010 may receive the type of the attribute information and the transformation information from the entropy decoder, and perform various color space inverse transforms such as RGB-YUV.

The attribute information filter 20012 may perform filtering using the neighboring attribute information based on the reconstructed geometry information. The attribute information filter 20012 may include a deblocking filter, an offset corrector, and an adaptive loop filter (ALF). The filter performs filtering on the reconstructed attribute information.

Figure 21:
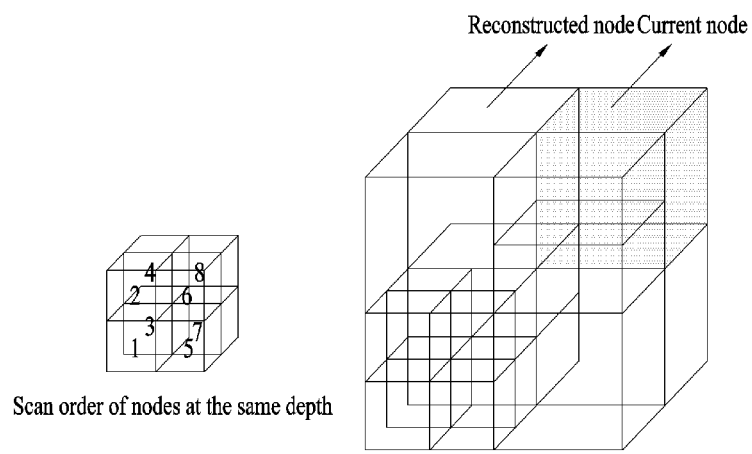
FIG. 21 illustrates an example of split nodes according to embodiments.

FIG. 21 illustrates an example of split nodes according to embodiments.

As described with reference to FIGS. 1 to 20, the point cloud data transmission device (e.g., the point cloud video encoder 10002, the point cloud encoder of FIG. 4, the transmission device of FIG. 12, the point cloud encoder of FIG. 15, the attribute encoder of FIG. 19, etc.) or the point cloud data reception device (e.g., the point cloud decoder of FIGS. 10 and 11, the reception device of FIG. 13, the point cloud decoder of FIG. 16, the attribute decoder of FIG. 20) may split nodes in processing the point cloud data. Specifically, the spatial partitioner 15002 of FIG. 15, the attribute information node splitter 19006 of FIG. 19, and the attribute information node splitter 20006 of FIG. 20 may split a node, which is a region including point cloud data, into subnodes such as slices or tiles, and the slices or tiles may be partitioned into nodes according to a specific partitioning structure. The split nodes may be encoded in a depth-first search order. Nodes at the same depth may be encoded in a specific order.

For each split node, the attribute information intra-predictor and the attribute information inter-predictor according to the embodiments may generate predicted attribute information, and transform or quantize the residual attribute information, which is a difference between the original attribute information and the predicted attribute information.

In performing prediction, transformation, and quantization on point cloud data, the prediction, transformation, and quantization operations may be performed separately for each of the Y, Cb, and Cr channels of the attribute information. The channels may be encoded simultaneously or in a predetermined order. For example, after the Y channel of the current node is encoded, the Cb and Cr channels may be encoded. In this case, the respective channels Y, Cb, and Cr of the attribute information may be referred to as a first channel, a second channel, and the like.

When the current node is no longer split, one or more channels (e.g., Y, Cb, Cr) of the attribute information may be restored in a specific order. For each channel of the attribute information, the coding mode (attr_coding_type) may be parsed. The coding mode may include rath, lifting, inter-node prediction, intra-node prediction, and cross-channel reference prediction.

When the channel of the attribute information that is to be decoded is the first in the decoding order, the attribute information may be decoded by parsing one of the coding modes excluding the cross-channel reference method. When the channel of the attribute information is not the first in the decoding order, the attribute information may be decoded by parsing one of the coding modes including the cross-channel reference method. When the current node is the first decoded node of the frame or slice, the attribute information may be decoded by parsing one of the coding modes excluding or including the cross-channel reference method.

Figure 22:
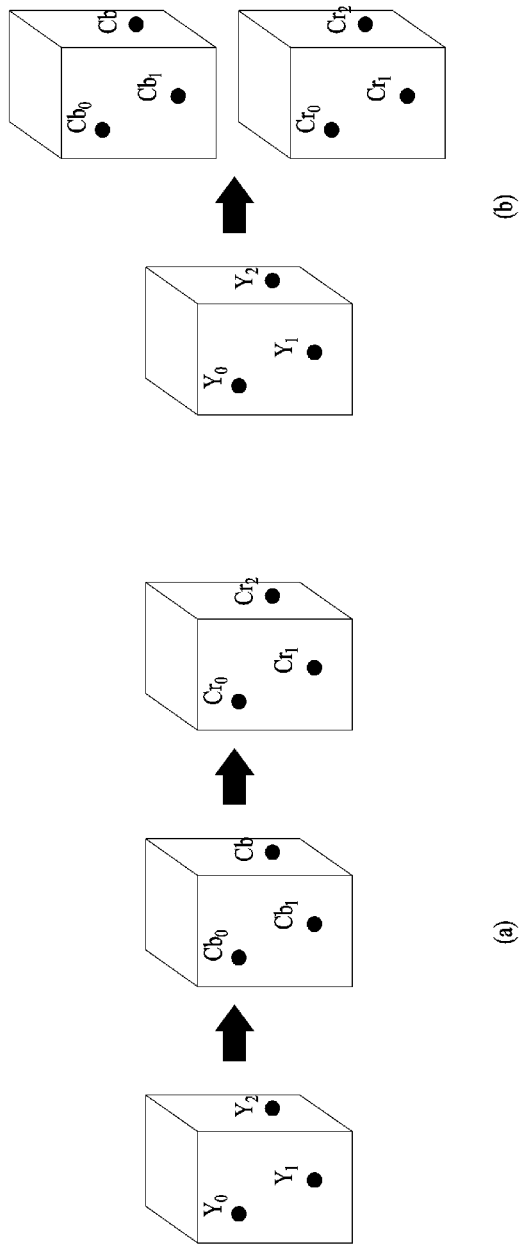
FIG. 22 illustrates an exemplary attribute information encoding procedure performed by a point cloud data transmission device according to embodiments.

FIG. 22 illustrates an example of an order of encoding of attribute information performed by a point cloud data transmission device according to embodiments. The encoding of the attribute information may be performed by the attribute information encoder 15006 of FIG. 15 or the attribute information encoder 19000 of FIG. 19. FIG. 22-(a) illustrates that the channels Y, Cb, and Cr of the attribute information are sequentially encoded one by one, and FIG. 22-(b) illustrates that the Y channel of the attribute information is encoded first, and then the Cb and Cr channels are encoded simultaneously.

The attribute information intra-predictor (see FIGS. 19 and 20) according to the embodiments may generate predicted attribute information per point or group of points of the attribute information with reference to the reconstructed attribute information of the current frame. The predicted attribute information means the attribute information predicted by the attribute information predictor according to embodiments.

The attribute information intra-predictor may perform intra-prediction on the basis of attribute information nodes split by the attribute information node splitter. The attribute information nodes may have a size of 1×1×1 or larger. An attribute information node may include one or more pieces of attribute information.

Figure 23:
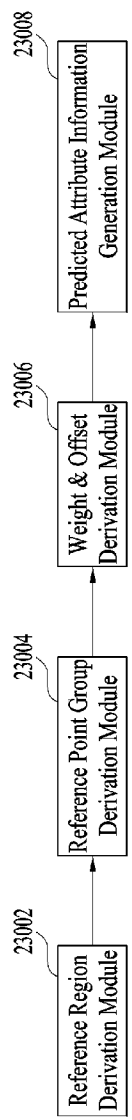
FIG. 23 illustrates a procedure of generating predicted attribute information according to a cross-channel reference prediction mode according to embodiments.
Figure 24:
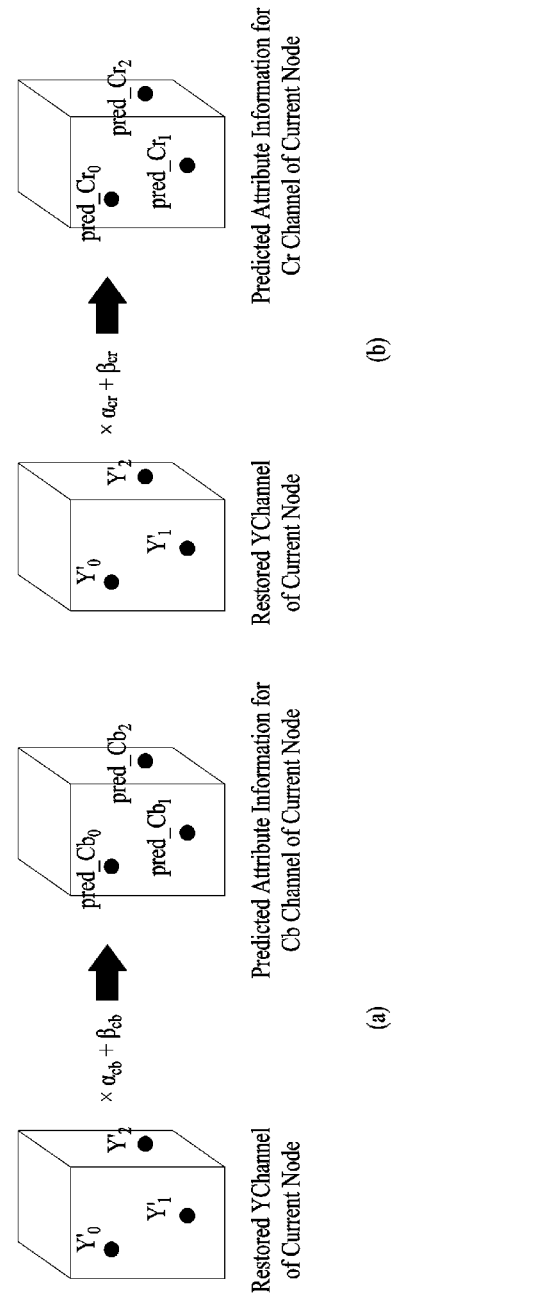
FIG. 24 illustrates a method for cross-channel reference prediction of attribute information according to embodiments.

FIG. 23 illustrates a procedure of generating predicted attribute information according to a cross-channel reference prediction mode according to embodiments, and FIG. 24 illustrates an example of generating predicted attribute information according to the cross-channel reference prediction mode according to embodiments. The operation of generating predicted attribute information in the cross-channel reference prediction mode according to the embodiments may be performed by a point cloud data transmission device (e.g., the point cloud video encoder 10002, the point cloud encoder of FIG. 4, the transmission device of FIG. 12, the point cloud encoder of FIG. 15, the attribute encoder of FIG. 19, etc.) or a point cloud data reception device (e.g., the point cloud decoder of FIGS. 10 and 11, the reception device of FIG. 13, the point cloud decoder of FIG. 16, the attribute decoder of FIG. 20). The transmission device according to embodiments and the reception device according to embodiments may include a reference region derivation module 23002, a reference point group derivation module 23004, a weight and offset derivation module 23006, and a predicted attribute information generation module 23008.

When the channels of attribute information in the current node are encoded sequentially instead of simultaneously, the encoding may be completed for a channel and then predicted attribute information of another channel may be generated and encoded based on the reconstructed channel. This coding mode is called cross-channel reference prediction mode. For example, when the encoding order of the channels of the attribute information is Y channel, Cb channel, and Cr channel, the current node may generate predicted attribute information of Cb channel and Cr channel based on the attribute information of reconstructed Y channel. That is, based on the value of a first channel of the attribute information, the value of a second channel of the attribute information is predicted. In this case, the first channel and the second channel of the attribute information may include one of the Y channel, the Cb channel, and the Cr channel. When the coding mode (attr_coding_type) is cross-channel reference prediction mode, the prediction node and the predicted attribute information may be generated according to the mode.

FIG. 24 illustrates a method for cross-channel reference prediction of attribute information according to embodiments. Referring to FIG. 24-(a), in the cross-channel reference prediction mode, the attribute information (Y'0, Y'1, Y'2) about the reconstructed Y channel of each point in the current node is multiplied by the weight $\alpha\_cb$ and then added to the offset $\beta\_cb$ to generate predicted attribute information (pred_Cb0, pred_Cb1, pred_Cb2) about the Cb channel. In this regard, the same $\alpha\_cr$ and $\beta\_cr$ may be applied to all points in the current node.

In FIG. 24, $\alpha\_cb$ and $\alpha\_cr$ denote weights, and $\beta\_cb$ and $\beta\_cr$ denote offsets. When multiple weights are provided, they may be expressed as a first weight, a second weight, or the like. When multiple offsets are provided, the offsets may be expressed as a first offset, a second offset, or the like.

In generating the predicted attribute information, the weight and offset information may be parsed or derived from a neighboring reference region by the encoder or decoder in the same way. Whether to parse the weights and offsets may be determined by parsing a flag indicating the same (parse_parameter_flag).

The cross-channel reference prediction mode may be performed as shown in FIG. 23. The weights and offsets may be derived by the transmission device or the reception device according to the embodiments. Further, the weights and offsets may be transmitted from the transmission device according to the embodiments to the reception device according to the embodiments. When the weights and offsets are transmitted, the related components for calculating the weights and offsets in the reception device according to the embodiments, namely the reference region derivation module 23002, the reference point group derivation module 23004, and the weight and offset derivation module 23006, may be omitted.

Figure 25:
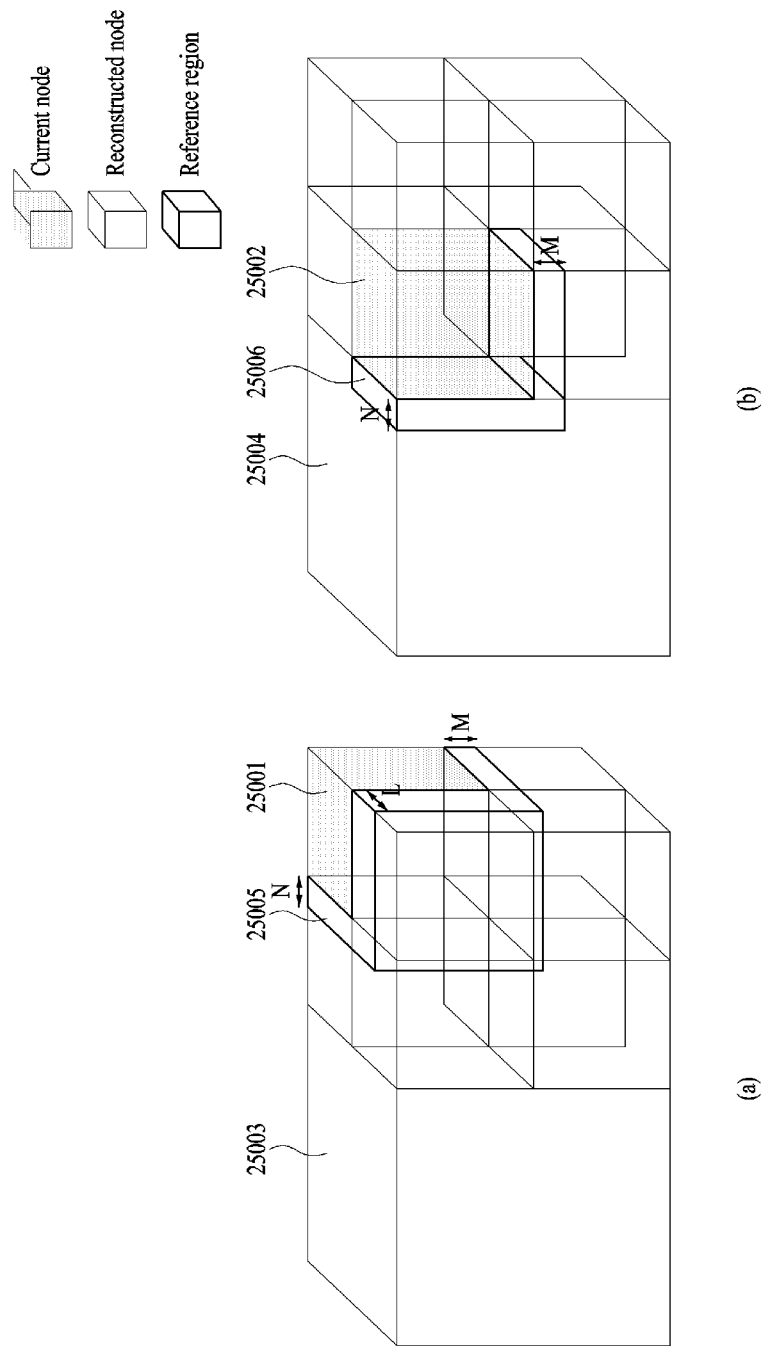
FIG. 25 illustrates an example of a reference region based on a position of a current node in relation to a cross-channel reference prediction mode according to embodiments.

FIG. 25 illustrates an example of a reference region based on the position of a current node in relation to a cross-channel reference prediction mode according to embodiments.

The reference region derivation module 23002 (FIG. 23) may derive a reference region to derive weights and offsets according to embodiments. The reference region may be a reconstructed region around the current node, and the range of the reference region may be derived based on the position of the current node.

Referring to FIG. 25, the number of the outermost voxel faces of the current node 25001, 25002 may be six, and a voxel face on which the reconstructed neighboring node and the current node touch may be determined based on the reconstruction order of the nodes. When there is only one voxel face on which the reconstructed neighbor abuts on the current node, a reconstructed region parallel to that voxel face, having the same width and/or height, and having a perpendicular distance less than or equal to a threshold (L, M, or N) from the voxel face may be the reference region 25005, 25006.

When there are two or more voxel faces on which the reconstructed neighboring node abuts on the current node 25001, 25002, the reference region derivation module 23002 may derive an additional reference region based on the range along each axis (x, y, z) of the two reference regions. When the two reference regions have the same range along an axis, the range may be included in the reference region. When the two reference regions have different ranges along an axis, a region having a range along an axis that does not overlap the current node may also be included in the reference region.

When there are three voxel faces on which the reconstructed neighboring node abuts on the current node, the reference region derivation module 23002 may derive, for each voxel face, a reconstructed voxel plane group that is parallel to the voxel face and have a perpendicular distance less than or equal to a threshold from the voxel face. The reference region may also include a region where at least two voxel plane groups overlap. As shown in FIG. 25, the region of a reconstructed neighboring node located in the diagonal direction from the current node may also be included in the reference region.

In other words, a cuboid region (located in the diagonal direction from the current node) that is parallel to any voxel face, has the same width and/or height as the voxel face, and has a perpendicular distance less than or equal to a threshold (L, M, or N) from the voxel face may be additionally included in the reference region.

The reference point group derivation module 23004 may select one or more points to be used for weight and offset derivation from among one or more points in the reference region derived by the reference region derivation module 23002, and may compute a representative point for the selected points. When there is no reference region, the operation of the reference point group derivation module 23004 may be omitted.

Figure 26:
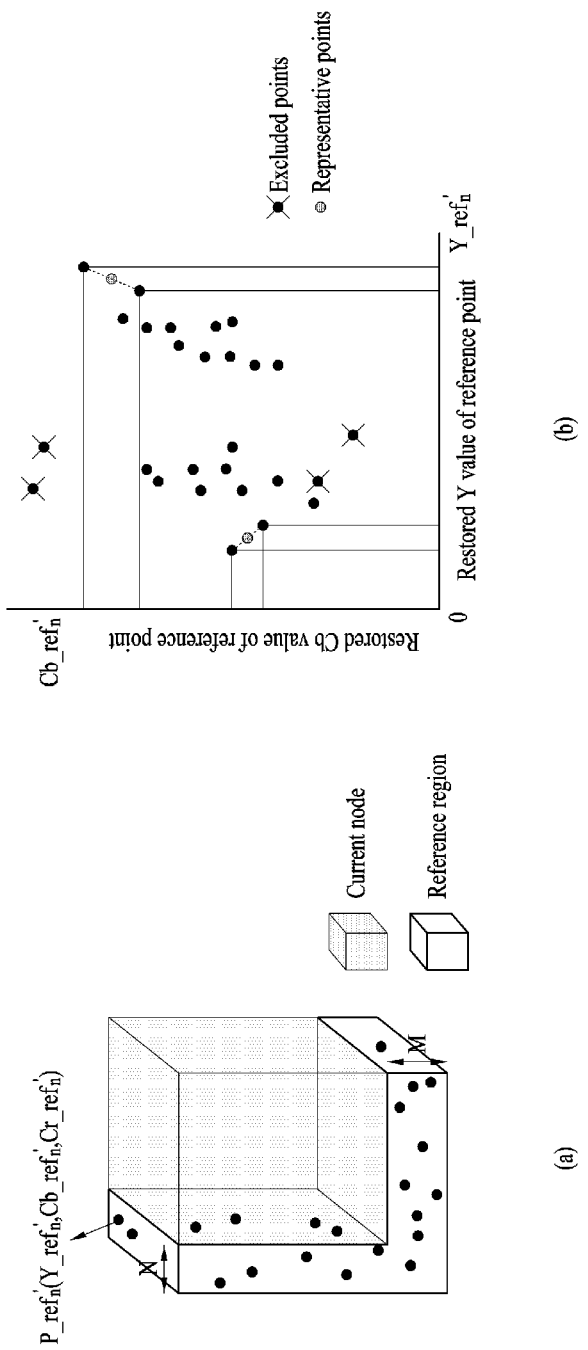
FIGS. 26 and 27 illustrate an example of selection of reference points and computation of a representative point in a cross-channel reference prediction mode according to embodiments.
Figure 27:
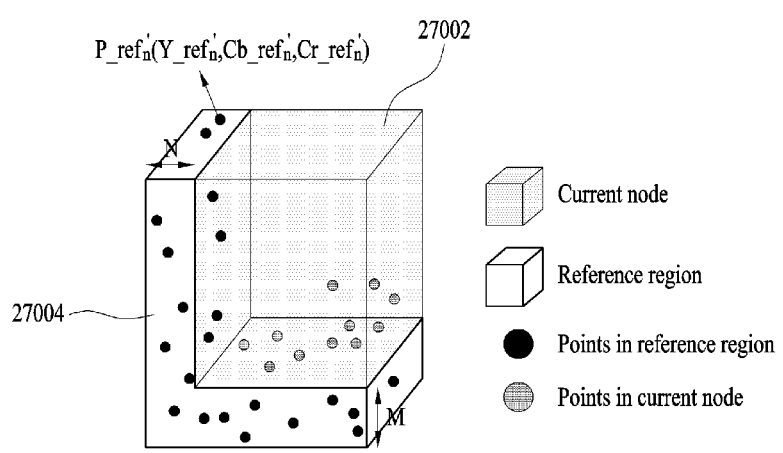

FIGS. 26 and 27 illustrate an example of selection of reference points and computation of a representative point in a cross-channel reference prediction mode according to embodiments.

The reference point group derivation module 23004 may select m points from among n points in the reference region, excluding some points (where n>=m). The reference point group derivation module 23004 may exclude points in the reference region that have an average or median of the reconstructed geometry information of the current node or a distance to the geometry information of any point in the reference region that is greater than or equal to a threshold. Alternatively, a point in the current node that is closest in distance to the geometry information of any point in the reference region may be identified, and points in the reference region having a distance greater than or equal to a threshold from the point in the current node may be excluded. For example, referring to FIG. 27, a reference region 27004 adjacent to two voxel faces of the current node 27002 is derived. However, when the points in the current node 27002 are distributed only near a specific voxel face, some points in the reference region 27004 adjacent to the other voxel faces may be excluded because they are determined to be distant from the points in the current node 27002. That is, some of the n points in the reference region 27004 may be excluded based on their distance from the points in the current node 27002.

The reference point group derivation module 23004 may select k representative points from among m points and derive weights and offsets using the k representative points. Referring to FIG. 26, the representative point derivation may be performed as follows. Two representative points may be derived based on a value obtained by averaging a points in ascending order of the values of the reconstructed Y channel, Cb channel, or Cr channel and a value obtained by averaging b points in descending order of the values of the reconstructed Y channel, Cb channel, or Cr channel. Alternatively, a point having the c-th least value of the reconstructed Y channel, Cb channel, or Cr channel and and a point having the d-th greatest value of the channel may be derived as the representative points. The operation of selecting reference points and computing representative points may be omitted. When the operation of selecting representative points is omitted, all k (=m) points may be representative points.

The weight and offset derivation module 23006 may derive weights and offsets using the representative points derived by the reference point group derivation module 23004. When there is no representative point or there is no reference region, the derivation operation of the weight and offset derivation module 23006 may be omitted, and predicted attribute information may be generated by parsing the weight and offset information. When a flag (parse_parameter_flag) indicating whether to parse weights and offsets is 1, the weights and offsets may be parsed. The weight and offset information may be derived and transmitted by the transmission device (or encoder) according to embodiments.

Figure 28:
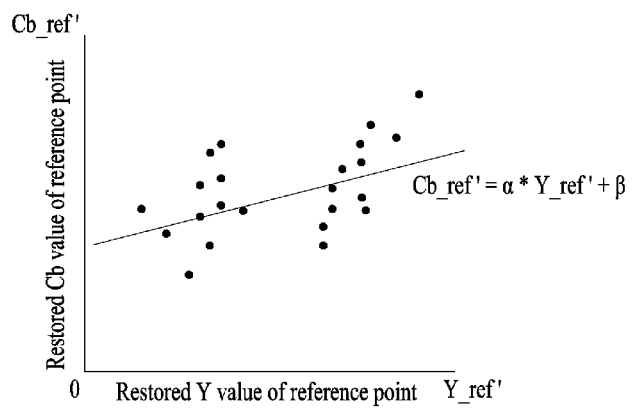
FIGS. 28 and 29 illustrate an example of deriving weight and offset information according to a cross-channel reference prediction mode according to embodiments.
Figure 29:
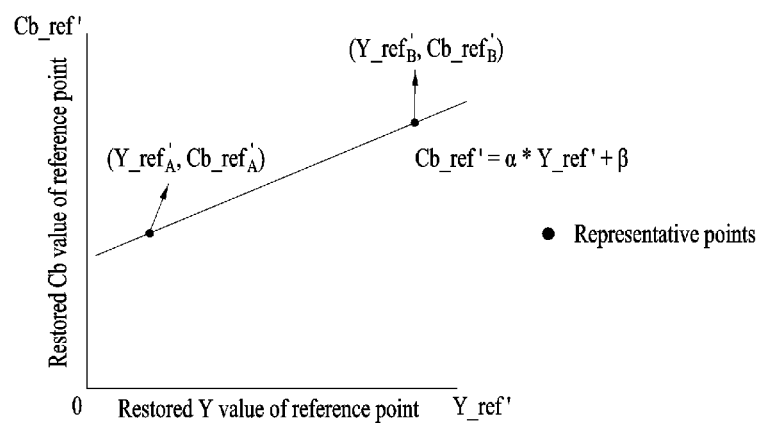

FIGS. 28 and 29 illustrate an example of deriving weight and offset information according to a cross-channel reference prediction mode according to embodiments. Referring to FIGS. 28 and 29, weights and offsets may be derived by deriving a linear relationship between the Y-channel values of the reconstructed attribute information and the original (or reconstructed) Cb (or Cr) channel.

Referring to FIG. 28, when there are three or more representative points, the weight and offset derivation module 23006 may derive weights and offsets by deriving a linear relationship (or correlation) between the reconstructed Y-channel values and the reconstructed Cb or Cr-channel values of multiple representative points. As shown in FIG. 28, a linear relationship with minimal error may be derived, and weights and offsets may be derived by the values of α and β in the linear relationship with minimal error. Here, the linear relationship may be derived by the least-squares method. Alternatively, the linear relationship may be derived by linear regression analysis.

FIG. 29 is an example of deriving a weight and an offset when there are two representative points. The weight and offset derivation module 23006 may derive a linear relationship equation (or correlation equation) connecting the two representative points, and derive the weight and offset by calculating the value of a (weight) and the value of β (offset) from the derived linear relationship equation.

The predicted attribute information generation module 23008 may generate a predicted value of the Cb or Cr channel (predicted attribute information) for the current node based on the reconstructed Y channel value (reconstructed attribute information) of the current node and the weight and offset.

Figure 30:
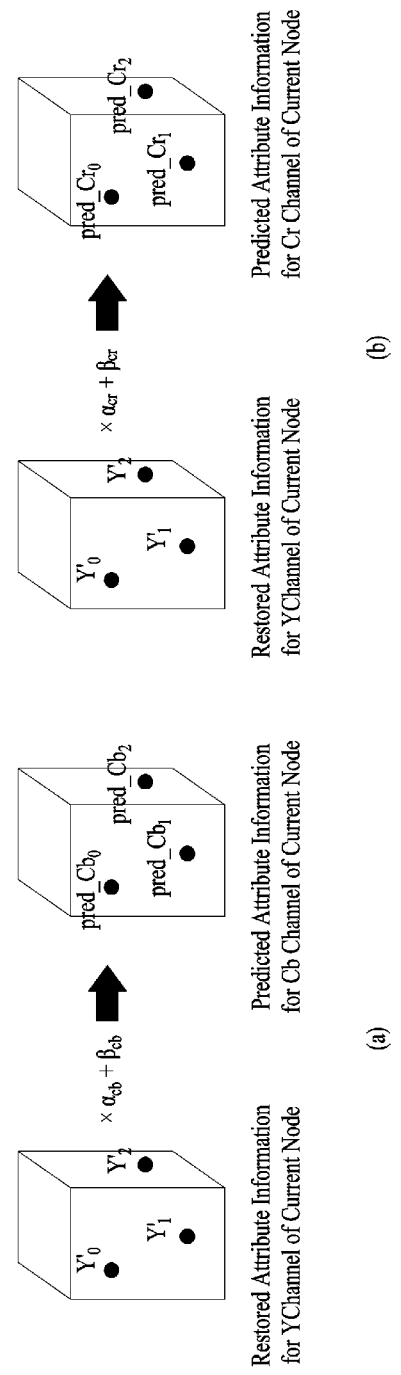
FIG. 30 illustrates an example of generating predicted attribute information according to a cross-channel reference prediction mode according to embodiments.

FIG. 30 illustrates an example of generating predicted attribute information according to a cross-channel reference prediction mode according to embodiments. Referring to FIG. 30, the predicted attribute information generation module 23008 may generate predicted attribute information for the Cb or Cr channel of the current node by multiplying the reconstructed attribute information for the Y channel of the current node by a weight (α_cb) and adding an offset (β_cb). The predicted attribute information may be used in reconstructing the attribute information by the point cloud data transmission device or reception device according to the embodiments based on the weight and offset. Further, the predicted attribute information may be used by the transmission device according to the embodiments to determine a prediction error, in which case the difference between the original attribute information and the predicted attribute information may be delivered to the reception device according to the embodiments.

Figure 31:
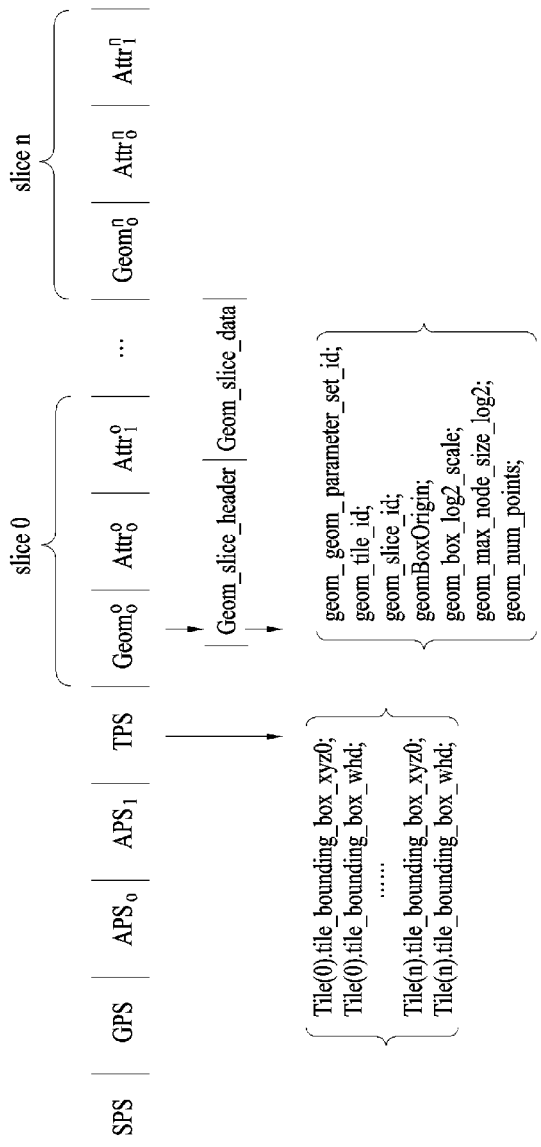
FIG. 31 illustrates an example of encoded point cloud data (bitstream) according to embodiments.

FIG. 31 illustrates an example of encoded point cloud data (bitstream) according to embodiments. The point cloud data transmission device according to the embodiments may deliver information related to the point-by-point quantization to the point cloud data reception device according to the embodiments in a bitstream as shown in FIG. 31.

The point cloud video encoder 10002 according to the embodiments may encode the point cloud data in the encoding 20001, and the transmitter 10003 according to the embodiments may transmit the bitstream as shown in FIG. 31 containing the encoded point cloud data to the reception device 10004.

The encoded point cloud data (the bitstream of FIG. 31) according to the embodiments may be generated by the point cloud video encoder 10002 of FIG. 1, the encoder 20001 of FIG. 2, the encoder of FIG. 4, the transmission device of FIG. 12, the XR device 1430 of FIG. 14, the point cloud encoder of FIG. 15, the geometry information encoder of FIG. 17, the attribute information encoder of FIG. 19, and/or hardware, software, firmware, or combinations thereof, including one or more processors or integrated circuits configured to communicate with one or more memories.

Also, the encoded point cloud data (bitstream) according to the embodiments may be decoded by the point cloud video decoder 10006 of FIG. 1, the decoder 20003 of FIG. 2, the decoder of FIG. 11, the reception device of FIG. 13, the XR device 1430 of FIG. 14, the point cloud decoder of FIG. 16, the geometry information decoder of FIG. 18, the attribute information decoder of FIG. 20, and/or hardware, software, firmware, or a combination thereof, including one or more processors or integrated circuits configured to communicate with one or more memories.

The abbreviations shown in FIG. 31 have the following meanings.

SPS: Sequence Parameter Set
GPS: Geometry Parameter Set
APS: Attribute Parameter Set
TPS: Tile Parameter Set
Geom: Geometry bitstream=geometry slice header+geometry slice data
Attr: Attribute bitstream=attribute slice header+attribute slice data The bitstream of FIG. 31 contains a sequence parameter set, a geometry parameter set, an attribute parameter set, or a tile parameter set. A tile parameter set (TPS) may include position (x, y, z) or size (width, height, depth) information about a bounding box contained in each tile (0 to n). Further, the bitstream of FIG. 31 contains point cloud data (geometry bitstream and attribute bitstream) encoded for each of n slices. For example, the geometry bitstream may be composed of a geometry slice header and geometry slice data (or payload). The geometry slice header may contain header information about the geometry contained in the payload, such as a geometry parameter set ID, geometry tile ID, and geometry slice ID. The attribute bitstream may be composed of an attribute slice header and attribute slice data (or payload).

Referring to FIG. 31, information on the point-wise quantization parameter according to the embodiments may be defined in a parameter set and a data unit header, and may be defined at a corresponding position or a separate position depending on an application or system such that the range and method to be applied may be configured differently. In the embodiments, it is described that information is defined in the attribute parameter set and the attribute data unit header, respectively. However, the information may be defined in the geometry parameter set for application to geometry information coding in conjunction with the geometry information coding method, or may be defined in a sequence parameter set, a tile parameter set, or the like. In addition, when the defined syntax element is applicable to a plurality of point cloud data streams as well as a point cloud data stream, the related information may be delivered to the reception device by a higher-level parameter set.

Signaling information according to embodiments may be generated in the compression (encoding) operation of the scalable point cloud compression transmission device/method and used in the decoding operation of the scalable point cloud compression reception device/method.

Parameters (which may be referred to as metadata, signaling information, etc.) according to embodiments may be generated during data processing of the transmission device (of FIGS. 1, 4, 12, 14, 15, 17, and 19) according to the embodiments, and may be transmitted to the reception device (of FIGS. 1, 11, 13, 14, 16, 18, and 20) according to the embodiments so as to be used in reconstructing point cloud data. For example, the parameters according to the embodiments may be generated by a metadata processor (or metadata generator) of the transmission device according to the embodiments, and acquired by a metadata parser of the reception device according to the embodiments.

A point cloud data encoder, transmission device, or the like according to embodiments may generate signaling information related to the operations according to embodiments, and may generate and transmit a bitstream containing point cloud data as described above. A point cloud data decoder, reception device, or the like according to embodiments may receive the bitstream and reconstruct the point cloud data based on the parameter(s) contained in the bitstream.

Attribute_node_tree( ) of the splitting structure information for splitting attribute information into attribute nodes may be recursively invoked. For example, the information may be recursively split from the top node (e.g., slice), or the end node that is no longer split may become an attribute node. In addition, attribute_data_unit( ) is transmitted per attribute node, and the attribute information coding data may be parsed according to the attribute coding type (attr_coding_type parsed from attribute_parameter_set( ) referenced in the attribute_data_unit_header( ) for each channel of the attribute node. When attr_coding_type==4, it may indicate a cross-channel reference prediction mode. When the coding mode for the channel of the attribute information is cross-channel reference prediction mode, attribute_data_unit_data_type_ccp( ) may be transmitted, where ccp may mean cross component prediction.

FIG. 32 shows an exemplary syntax of attribute_node_tree( ) according to embodiments.

FIG. 33 illustrates an exemplary syntax of attribute_data_unit according to embodiments.

FIG. 34 shows an exemplary syntax of attribute_data_unit_data_ccp( ) according to embodiments.

When the information of attribute_node_tree( ) attribute_data_unit, and attribute_data_unit_data_ccp( ) changes from node to node, it may be included in attribute_data_unit (or payload). When the information changes from slice to slice, it may be included in attribute_data_unit_header (or attribute slice header). When it changes from frame to frame, it may be included in attribute_parameter_set.

split_node_flag indicates whether to perform splitting on nodes that are in the process of splitting.

split_type indicates the split type of the node, which may include octree, quadtree, and binary tree.

split_direction indicates the split direction index when the split type is not octree.

As many pieces of Attribute_node_tree( ) information may be delivered as the number of child nodes generated by the splitting of a node. For a node that is no longer being split, attribute_data_unit( ) is delivered. The attribute_data_unit( ) parses the attribute coding data according to the channel-specific coding type of the attribute information. When attr_coding_type==4, it may indicate the cross-channel reference prediction mode, and attribute_data_unit_data_type_ccp( ) may be delivered.

parse_parameter_flag indicates whether to parse a weight and offset when the prediction method is in the cross-channel reference prediction mode. Parse_parameter_flag equal to 1 indicates that the weight and offset are delivered.

weight indicates the weight when the prediction method is in the cross-channel reference prediction mode.

offset indicates the offset when the prediction method is in the cross-channel reference prediction mode.

Figure 35:
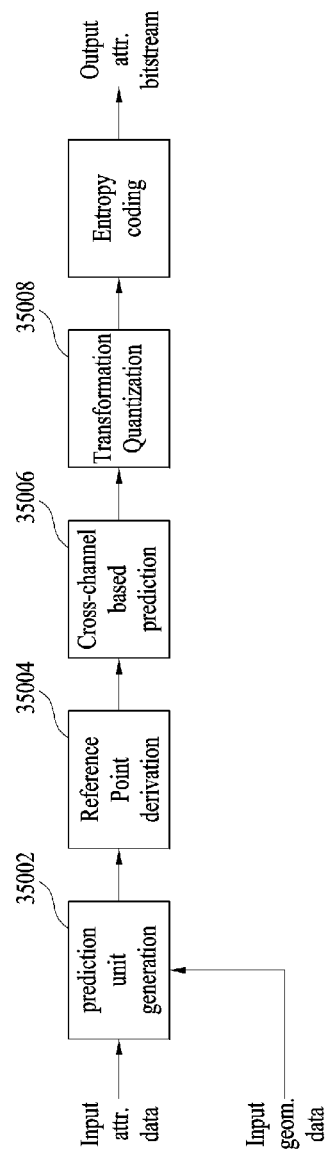
FIG. 35 illustrates an exemplary point cloud data transmission device according to embodiments.

FIG. 35 illustrates an exemplary point cloud data transmission device according to embodiments. The point cloud data transmission device according to the embodiments (e.g., the point cloud encoder of FIGS. 1, 4, the point cloud data transmission device of FIG. 12, the point cloud encoder of FIG. 15, the attribute information encoder of FIG. 19, etc.) may compress attribute information in the cross-channel reference prediction mode as illustrated in FIG. 35. Further, the point cloud data transmission device according to the embodiments may apply the concepts of the present disclosure in compression of geometry information or other information. Further, the cross-channel reference prediction mode according to the embodiments may be used as a stand-alone attribute information prediction method, or may be used in combination with attribute compression methods such as RAHT, Lifting, and Predictive.

The point cloud data transmission device of FIG. 35 may be included in, combined with, or correspond to components of the point cloud encoder of FIGS. 1 and 4, the point cloud data transmission device of FIG. 12, the point cloud encoder of FIG. 15, the attribute information encoder of FIG. 19, and the like.

Referring to FIG. 35, a point cloud data transmission device according to embodiments may include a prediction unit generation module 35002, a reference point derivation module 35004, a cross-channel based prediction module 35006, and a transform/quantization part.

The prediction unit generation module 35002 may generate prediction nodes used for prediction based on geometry information about a point. For a point, prediction is performed based on neighbor points and prediction nodes. The reference point derivation module 35004 may derive a reference region based on the prediction node, select points in the reference region adjacent to the prediction node, and derive a reference point group. In this case, the reference point derivation module 35004 may transmit information (N, M, L, etc. in FIG. 25) for defining the reference point group. The reference point derivation module 35004 may select points that may best represent the attributes of the current node in the reference point group, or remove unnecessary points and select multiple representative points, and may predefine or transmit a method of selecting the representative points to the reception device. Then, based on the representative points, it may calculate a weight and an offset that may represent a relationship between the channels of the attribute information at the current node. The cross-channel based prediction module 35006 may generate predicted attribute information based on the weight and offset. In this case, a value corresponding to the prediction error may be transmitted to the reception device for lossless compression.

The reference point derivation module 35004 and cross-channel based prediction module 35006 shown in FIG. 35 may correspond to the reference region derivation module 23002, reference point group derivation module 23004, weight and offset derivation module 23006, and predicted attribute information generation module 23008 shown in FIG. 23. For example, the reference point derivation module 35004 of FIG. 35 may correspond to the reference region derivation module 23002, reference point group derivation module 23004, and weight and offset derivation module 23006 of FIG. 23, and the cross-channel based prediction module 35006 of FIG. 35 may correspond to the predicted attribute information generation module 23008 of FIG. 23.

Figure 36:
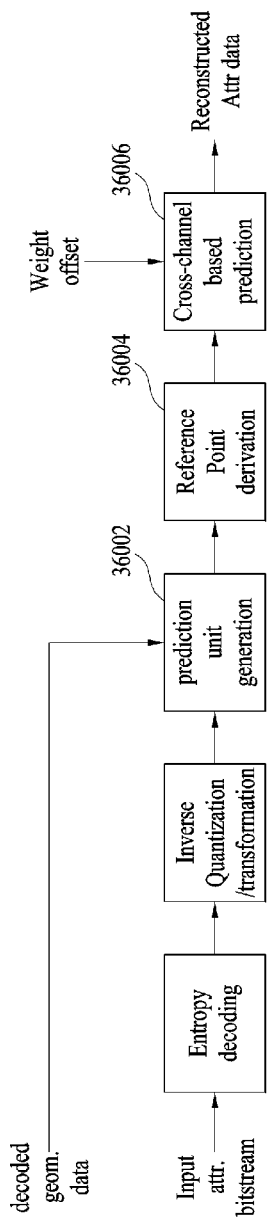
FIG. 36 illustrates an exemplary point cloud data reception device according to embodiments.

FIG. 36 illustrates an exemplary point cloud data reception device according to embodiments. The point cloud data reception device according to the embodiments (e.g., the point cloud decoder of FIG. 1, the point cloud decoder of FIG. 11, the point cloud data reception device of FIG. 13, the point cloud decoder of FIG. 16, the attribute information decoder of FIG. 20, etc.) may reconstruct the attribute information using a cross-channel reference prediction method as illustrated in FIG. 36.

The point cloud data reception device of FIG. 36 may be included in, combined with, or correspond to components of the point cloud decoder of FIG. 1, the point cloud decoder of FIG. 11, the point cloud data reception device of FIG. 13, the point cloud decoder of FIG. 16, and the attribute information decoder of FIG. 20.

Referring to FIG. 36, a point cloud data reception device according to embodiments may include a prediction unit generation module 36002, a reference point derivation module 36004, and a cross-channel based prediction module 36006.

The reception device of FIG. 36 may perform entropy decoding, inverse transformation, and inverse quantization on the received attribute bitstream to restore the data. Then, the prediction unit generation module 36002 may generate a prediction node based on the reconstructed geometry information, and the reference point derivation module 36004 may derive a reference for the prediction node based on the point information belonging to previously reconstructed neighbor nodes. When weight and offset parameters are delivered (parse_parameter_flag=1), cross-channel reference prediction may be performed based on the delivered weight and offset information. When the weight and offset parameters are not delivered (parse_parameter_flag=0), the weight and offset may be derived based on the reference points in the reference region. In this case, information about the prediction node (split_type, split_direction) and information about the reference region calculation method, reference point selection method, representative point calculation method, weight and offset calculation method, and the like may be transmitted as parameters.

The reference point derivation module 36004 and cross-channel based prediction module 36006 shown in FIG. 36 may correspond to the reference region derivation module 23002, reference point group derivation module 23004, weight and offset derivation module 23006, and prediction attribute information generation module 23008 shown in FIG. 23. For example, the reference point derivation module 36004 of FIG. 36 may correspond to the reference region derivation module 23002, reference point group derivation module 23004, and weight and offset derivation module 23006 of FIG. 23, and the cross-channel based prediction module 36006 of FIG. 36 may correspond to the predicted attribute information generation module 23008 of FIG. 23.

Figure 37:
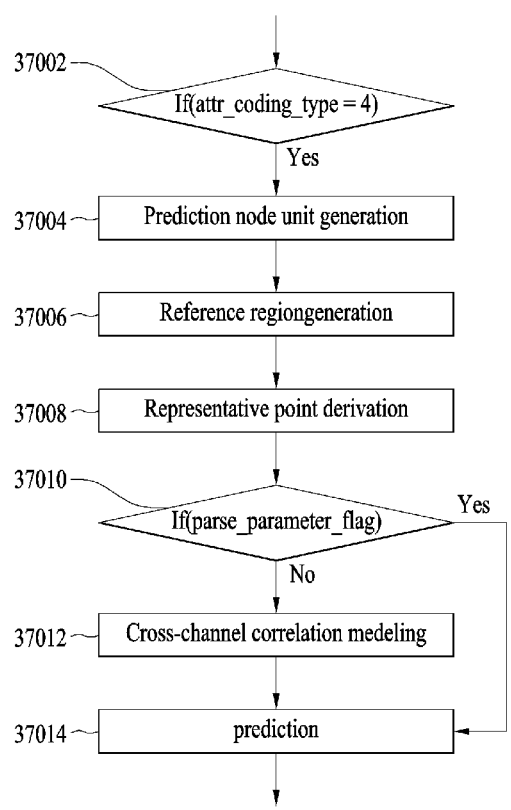
FIG. 37 illustrates a procedure for generating predicted attribute information according to a cross-channel reference prediction mode by a point cloud data reception device according to embodiments.

FIG. 37 illustrates a procedure for generating predicted attribute information according to a cross-channel reference prediction mode by a point cloud data reception device according to embodiments.

Attr_coding_type equal to 4 indicates the cross-channel reference prediction mode (31002). When the cross-channel reference prediction mode is performed, a prediction node, wihch is a unit node for performing the prediction, is generated (37004). Generation of the prediction node may be performed by the prediction unit generation module 36002 of FIG. 36. Next, a reference region for the prediction node is derived (37006). The derivation of the reference region may be performed by the reference region derivation module 23003 of FIG. 23, which has been described with reference to FIGS. 23 to 25. Next, a reference point for reference in the prediction is derived (37008). The derivation of the reference point may be performed by the reference point group derivation module 23004 described with reference to FIGS. 23 to 25. Next, a weight and offset are derived based on the cross-channel correlation in response to whether the weight and offset parameters are delivered. When the weight and offset parameters are delivered (parse_parameter_flag==1), attribute information may be predicted using the weight and offset parameters (37014). When the weight and offset parameters are not delivered (parse_parameter_flag==0), the weight and offset are calculated based on the cross-channel correlation (37012). The derivation of the weight and offset may be performed by the weight and offset derivation module 23006 of FIG. 23, which has been described with reference to FIGS. 26 to 29. Additionally, checking whether the weight and offset parameters are delivered may be performed immediately after the prediction node is generated.

Figure 38:
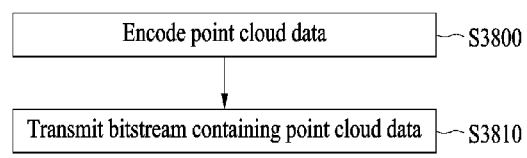
FIG. 38 illustrates an exemplary method of transmitting point cloud data according to embodiments.

FIG. 38 illustrates an exemplary method of transmitting point cloud data according to embodiments. Referring to FIG. 38, the method includes operation S3800 of encoding point cloud data and operation S3810 of transmitting a bitstream containing the point cloud data. Furthermore, operation S3800 of encoding the point cloud data may include encoding geometry information of the point cloud data and encoding attribute information of the point cloud data.

In operation S3800 of encoding the point cloud data, the point cloud data may be encoded by the point cloud video encoder 10002 of FIG. 1, the encoder 20001 of FIG. 2, the encoder of FIG. 4, the transmission device of FIG. 12, the XR device 1430 of FIG. 14, the encoder of FIGS. 15, 17, and 19, the transmission device of FIG. 35, and/or hardware, software, firmware, or a combination thereof, including one or more processors or integrated circuits configured to communicate with one or more memories.

In operation 3810 of transmitting the bitstream containing the point cloud data, the point cloud data may be transmitted by the transmitter 10003 of FIG. 1, the transmission processor 12012 of FIG. 12, the XR device 1430 of FIG. 14, the transmission device of FIGS. 15 and 35, and/or hardware, software, firmware, or a combination thereof, including one or more processors or integrated circuits configured to communicate with one or more memories.

Operation S3800 of encoding the point cloud data includes encoding geometry information and encoding attribute information. In the encoding of the geometry information, the geometry information may be encoded based on an octree, a predictive tree, or a trisoup. In the encoding of the attribute information, the attribute information may be encoded based on prediction/lifting transform or RATH transform.

The operation of encoding the attribute information of the point cloud data includes restoring a first channel value of the attribute information and predicting a second channel value of the attribute information based on the restoring first channel value. When the attribute information has a Y channel value, a Cb channel value, and a Cr channel value, the first channel value may be the Y channel value, and the second channel value may be the Cb or Cr channel value.

The operation of predicting the second channel value of the attribute information based on the restored first channel value may include deriving a reference region of a node neighboring the current node, selecting a reference point belonging to the reference region, and deriving a linear relationship (or correlation) of the first channel and the second channel of the attribute information based on the selected reference point.

A method of deriving the reference region of a node neighboring the current node has been described with reference to FIGS. 23 to 25, and may be performed by the reference region derivation module 23002 of FIG. 23. Here, the current node may be a prediction node generated for predicting attribute information per prediction unit, and the prediction node may be generated by the prediction unit generation module 35002 of FIG. 35.

A method for selecting reference points belonging to the reference region has been described with reference to FIGS. 23 to 25, and may be performed by the reference point group derivation module 23004 of FIG. 23. The operation of selecting the reference points may include selecting the reference point based on a distance between the points belonging to the current node and the points belonging to the reference region. Further, a plurality of representative points may be selected from among the selected reference points.

A method of deriving a linear relationship (or correlation) between the first channel and the second channel has been described with reference to FIGS. 26 to 29, and may be performed by the weight and offset derivation module 23006 of FIG. 23. The operation of deriving the linear relationship between the first and second channels of the attribute information may include deriving the linear relationship using a least squares method based on the selected reference points, and calculating a weight and offset. Further, when two representative points are selected from among the selected reference points, a linear relationship may be derived for the two representative points.

Figure 39:
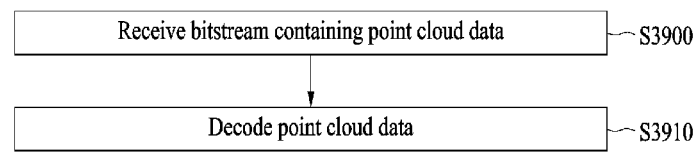
FIG. 39 illustrates an exemplary method of receiving point cloud data according to embodiments.

FIG. 39 illustrates an exemplary point cloud data reception method according to embodiments. Referring to FIG. 39, the method includes receiving a bitstream containing point cloud data (S3900) and decoding the point cloud data (S3910). Operation S3910 of decoding the point cloud data includes decoding geometry information of the point cloud data and decoding attribute information of the point cloud data.

In operation S3900 of receiving the bitstream containing the point cloud data, the point cloud data may be received by the reception device 10004 of FIG. 1, the reception device of FIGS. 10 and 11, the receiver 13000 of FIG. 13, the XR device 1430 of FIG. 14, the decoder of FIGS. 16, 18 and 20, the reception device of FIG. 36, and/or hardware, software, firmware, or a combination thereof, including one or more processors or integrated circuits configured to communicate with one or more memories.

In operation S3910 of decoding the point cloud data, the point cloud data may be decoded by the point cloud video decoder 10006 of FIG. 1, the reception device of FIGS. 10, 11, and 13, the XR device 1430 of FIG. 14, the decoders of FIGS. 16, 18, and 20, the reception device of FIG. 36, and/or hardware, software, firmware, or combinations thereof, including one or more processors or integrated circuits configured to communicate with one or more memories.

The operation of decoding the attribute information of the point cloud data includes restoring a first channel value of the attribute information, and predicting a second channel value of the attribute information based on the restored first channel value.

The operation of predicting the second channel value of the attribute information based on the restored first channel value includes deriving a reference region of a node neighboring the current node, selecting a reference point belonging to the reference region, and deriving a linear relationship of the first channel and the second channel of the attribute information based on the selected reference point.

The operation of selecting the reference points includes selecting the reference point based on a distance between the points belonging to the current node and the points belonging to the reference region. In the operation of deriving the linear relationship between the first and second channels of the attribute information based on the selected reference points, the linear relationship is derived using the least squares method.

The operation of selecting the reference points includes selecting two representative points among the selected reference points. The operation of deriving the linear relationship between the first channel and the second channel of the attribute information based on the selected reference points includes deriving the linear relationship for the two representative points.

The cross-channel reference prediction performed in the process of decoding the attribute information of the point cloud data may correspond to the cross-channel reference prediction performed in the process of encoding the attribute information of the point cloud data. Accordingly, regarding the decoding of the attribute information, reference may be made to the description of the encoding of the attribute information in FIG. 38.

The point cloud data transmission method/device and reception method/device according to the embodiments may generate predicted attribute information by predicting a second channel value or a third channel value from a first channel value of the attribute information based on cross-channel correlation of the attribute information. In other words, by transmitting certain parameters on a node-by-node basis based on cross-channel correlation, redundant information may be removed and compression efficiency may be increased.

In addition, even when the transmission device does not transmit the weight and offset information for predicting the attribute information to the reception device for every point, the point cloud data transmission method/device and the reception method/device according to the embodiments may predict the attribute information by directly deriving the weight and offset information based on the similarity between the channels by the reception device. Therefore, the computational complexity and the size of the bitstream may be reduced and the transmission efficiency may be increased.

Further, the method/device for transmitting and receiving point cloud data according to the embodiments may increase compression efficiency and enable the reception device to decode the point cloud data accurately and quickly, based on the signaling information related to the PCC encoding/decoding operation according to the embodiments. Further, the method/device for transmitting and receiving point cloud data according to the embodiments may provide modeling of Y and Cb/Cr on a per-node group basis, in addition to the operation of delivering the difference from the G residual instead of the R/B residual.

The operations according to embodiments may be performed by the transmission device and/or reception device according to the embodiments. The transmission/reception device may include a transmitter/receiver configured to transmit or receive media data, a memory configured to store instructions (program code, algorithms, and/or data) for the processes according to embodiments, and a processor configured to control the operations of the transmission/reception device. The processor may be referred to as a controller, module, or the like, and may correspond to hardware, software, and/or a combination thereof. The operations according to the above-described embodiments may be performed by the processor. Further, the processor may be implemented as an encoder/decoder or the like for the operations of the above-described embodiments.

Embodiments have been described in terms of the method and/or device, and descriptions of methods and devices may be applied so as to complement each other.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same.

Executable instructions for performing the method/operations of the device according to the embodiments may be stored in a non-transitory CRM or other computer program products configured to be executed by one or more processors, or may be stored in a transitory CRM or other computer program products configured to be executed by one or more processors.

In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or a combination thereof. The firmware, software, and/or a combination thereof may be stored in the processor or the memory.

The operations according to the above-described embodiments may be performed by the transmission device and/or the reception device according to the embodiments. The transmission/reception device includes a transmitter/receiver configured to transmit and receive media data, a memory configured to store instructions (program code, algorithms, flowcharts and/or data) for a process according to embodiments, and a processor configured to control operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

MODE FOR DISCLOSURE

As described above, related contents have been described with reference to the best mode for carrying out the embodiments.

INDUSTRIAL APPLICABILITY

As described above, the embodiments may be fully or partially applied to the point cloud data transmission/reception device and system. It will be apparent to those skilled in the art that various changes or modifications can be made to the embodiments within the scope of the embodiments. Thus, it is intended that the embodiments cover the modifications and variations of this disclosure provided they come within the scope of the appended claims and their equivalents.

The invention claimed is:

1. A method of encoding point cloud data by an encoder, the method comprising:
encoding point cloud data; and
transmitting a bitstream containing the point cloud data,
wherein the encoding of the point cloud data comprises:
encoding geometry information of the point cloud data; and
encoding attribute information of the point cloud data,
wherein the encoding the attribute information of the point cloud data includes
predicting the attribute information based on range information of a reference region, wherein points are set for the predicting based on the range information of the reference region, wherein the attribute information is predicted based on an offset which is derived based on values related to the points.

2. The method of claim 1, wherein the encoding of the attribute information of the point cloud data comprises:
restoring a first channel value of the attribute information; and
predicting a second channel value of the attribute information based on the restored first channel value.

3. The method of claim 2, wherein the predicting of the second channel value of the attribute information based on the restored first channel value comprises:
Deriving the reference region adjacent to a node;
selecting reference points belonging to the reference region;
deriving a linear relationship between a first channel and a second channel of the attribute information based on the selected reference point.

4. The method of claim 3, wherein the selecting of the reference points comprises:
selecting the reference points based on a distance between points belonging to the node and points belonging to the reference region.

5. The method of claim 3, wherein the deriving of the linear relationship between the first channel and the second channel of the attribute information based on the selected reference points comprises:
deriving the linear relationship using a least squares method.

6. The method of claim 4, wherein the selecting of the reference points comprises:
selecting two representative points from among the selected reference points,
wherein the deriving of the linear relationship between the first channel and the second channel of the attribute information based on the selected reference points comprises:
deriving a linear relationship for the two representative points.

7. A device for encoding point cloud data, comprising:
a memory; and
a processor connected to the memory, wherein the processor is configured to:
encode point cloud data; and
transmit a bitstream containing the point cloud data,
wherein the processor is further configured to:
encode geometry information of the point cloud data; and
encode attribute information of the point cloud data,
wherein the processor is further configured to:
predict the attribute information based on range information of a reference region, wherein points are set for the predicting based on the range information of the reference region, wherein the attribute information is predicted based on an offset which is derived based on values related to the points.

8. The device of claim 7, wherein
the processor is further configured to predict, based on a restored first channel value of the attribute information, a second channel value of the attribute information.

9. The device of claim 8, wherein the processor is further configured to:
derive the reference region adjacent to a node;
select reference points belonging to the reference region; and
derive a linear relationship between a first channel and a second channel of the attribute information based on the selected reference points.

10. The device of claim 9, wherein the processor is further configured to select the reference points based on a distance between points belonging to the node and points belonging to the reference region.

11. The device of claim 9, wherein the processor is further configured to derive the linear relationship using a least squares method.

12. The device of claim 10, wherein the processor is further configured to select two representative points from among the selected reference points,
wherein the processor is further configured to derive a linear relationship for the two representative points.

13. A method of decoding point cloud data by a decoder, the method comprising:
receiving a bitstream containing point cloud data; and
decoding the point cloud data,
wherein the decoding of the point cloud data comprises:
decoding geometry information of the point cloud data; and
decoding attribute information of the point cloud data,
wherein the decoding the attribute information of the point cloud data includes
predicting the attribute information based on range information of a reference region, wherein points are set for the predicting based on the range information of the reference region, wherein the attribute information is predicted based on an offset which is derived based on values related to the points.

14. The method of claim 13, wherein the decoding of the attribute information of the point cloud data comprises:
restoring a first channel value of the attribute information; and
predicting a second channel value of the attribute information based on the restored first channel value.

15. The method of claim 14, wherein the predicting of the second channel value of the attribute information based on the restored first channel value comprises:
deriving the reference region adjacent to a node;
selecting reference points belonging to the reference region; and
deriving a linear relationship between a first channel and a second channel of the attribute information based on the selected reference points.

16. The method of claim 15, wherein the selecting of the reference points comprises:
selecting the reference points based on a distance between points belonging to the node and points belonging to the reference region.

17. The method of claim 15, wherein the linear relationship between the first channel and the second channel of the attribute information based on the selected reference points comprises:

deriving the linear relationship using a least squares method.

18. The method of claim 16, wherein the selecting of the reference points comprises:

selecting two representative points from among the selected reference points, wherein the linear relationship between the first channel and the second channel of the attribute information based on the selected reference points comprises:

deriving a linear relationship for the two representative points.

19. A device for decoding point cloud data, comprising:

a memory; and a processor connected to the memory, wherein the processor is configured to:

receive a bitstream containing point cloud data; and decode the point cloud data, wherein the processor is further configured to:

decode geometry information of the point cloud data; and decode attribute information of the point cloud data, wherein the processor is further configured to:

predicting the attribute information based on range information of a reference region, wherein points are set for the predicting based on the range information of the reference region, wherein the attribute information is predicted based on an offset which is derived based on values related to the points.

20. The device of claim 19, wherein the attribute the processor is further configured to predict, based on a restored first channel value of the attribute information, a second channel value of the attribute information.

21. The device of claim 20, wherein the processor is further configured to:

derive the reference region adjacent to a node;

select reference points belonging to the reference region; and derive a linear relationship between a first channel and a second channel of the attribute information based on the selected reference points.

22. The device of claim 21, wherein the processor is further configured to select the reference points based on a distance between points belonging to the node and points belonging to the reference region.

23. The device of claim 20, wherein the processor is further configured to derive the linear relationship using a least squares method.

24. The device of claim 22, wherein the processor is further configured to select two representative points from among the selected reference points, wherein the processor is further configured to derive a linear relationship for the two representative points.

* * * * *